US011843492B2

(12) United States Patent
Wu et al.

(10) Patent No.: US 11,843,492 B2
(45) Date of Patent: *Dec. 12, 2023

(54) METHOD AND APPARATUS FOR DETERMINING REFERENCE SIGNAL SEQUENCE, COMPUTER PROGRAM PRODUCT, AND COMPUTER READABLE STORAGE MEDIUM

(71) Applicant: Huawei Technologies Co., Ltd., Shenzhen (CN)

(72) Inventors: Ming Wu, Shenzhen (CN); Hao Tang, Ottawa (CA); Chi Zhang, Shanghai (CN); Mengying Ding, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,363

(22) Filed: Feb. 18, 2022

(65) Prior Publication Data

US 2022/0255697 A1 Aug. 11, 2022

Related U.S. Application Data

(63) Continuation of application No. 16/204,908, filed on Nov. 29, 2018, now Pat. No. 11,258,556, which is a
(Continued)

(30) Foreign Application Priority Data

May 5, 2017 (CN) .......................... 201710313804.0

(51) Int. Cl.
*H04L 27/26* (2006.01)
*H04W 72/04* (2023.01)
(Continued)

(52) U.S. Cl.
CPC ..... *H04L 27/26035* (2021.01); *H04B 7/0452* (2013.01); *H04J 11/0023* (2013.01);
(Continued)

(58) Field of Classification Search
CPC ... H04L 49/552; H04L 5/0051; H04L 5/0053; H04L 5/0007; H04L 5/0092; H04L 5/023;
(Continued)

(56) References Cited

U.S. PATENT DOCUMENTS

| 11,088,801 B2* | 8/2021 | Ko ..................... H04L 27/26025 |
| 2006/0039451 A1* | 2/2006 | Zhuang ................. H04L 27/261 |
| | | 375/145 |

(Continued)

FOREIGN PATENT DOCUMENTS

| CN | 101330325 A | 12/2008 |
| CN | 101394263 A | 3/2009 |

(Continued)

OTHER PUBLICATIONS

U.S. Appl. No. 62/420,462 (Year: 2017).*
(Continued)

*Primary Examiner* — Dung B Huynh
(74) *Attorney, Agent, or Firm* — SLATER MATSIL, LLP

(57) ABSTRACT

A method for determining a reference signal sequence, a terminal device, and a network device, the including receiving, by a terminal device, first indication information sent by a network device, determining, by the terminal device, a target resource based on the first indication information, determining, by the terminal device, a reference signal sequence based on parameters of a first bandwidth and parameters of a second bandwidth, and sending or receiving, by the terminal device, the reference signal sequence on the target resource.

24 Claims, 7 Drawing Sheets

Related U.S. Application Data continuation of application No. PCT/CN2018/085607, filed on May 4, 2018.

(51) Int. Cl.
  *H04L 5/00* (2006.01)
  *H04B 7/0452* (2017.01)
  *H04L 5/14* (2006.01)
  *H04J 11/00* (2006.01)

(52) U.S. Cl.
  CPC .............. *H04L 5/00* (2013.01); *H04L 5/0048* (2013.01); *H04L 5/0064* (2013.01); *H04L 5/0092* (2013.01); *H04L 5/14* (2013.01); *H04L 27/2613* (2013.01); *H04L 27/2646* (2013.01); *H04W 72/04* (2013.01)

(58) Field of Classification Search
  CPC .............. H04L 27/2602; H04W 48/12; H04W 72/0446; H04W 72/042; H04W 72/0453; H04W 72/048
  See application file for complete search history.

(56) References Cited

U.S. PATENT DOCUMENTS

| | | | |
|---|---|---|---|
| 2010/0067464 A1* | 3/2010 | Higuchi | H04J 13/16 370/329 |
| 2010/0118990 A1 | 5/2010 | Lee et al. | |
| 2011/0090862 A1 | 4/2011 | Liang et al. | |
| 2011/0237214 A1* | 9/2011 | Swarts | H04W 56/0035 455/226.1 |
| 2012/0082119 A1 | 4/2012 | Chung et al. | |
| 2012/0329468 A1* | 12/2012 | Chmiel | H04L 5/0007 455/450 |
| 2013/0070725 A1* | 3/2013 | Wang | H04W 72/044 370/336 |
| 2013/0235754 A1* | 9/2013 | Lim | H04W 24/00 370/252 |
| 2014/0133395 A1 | 5/2014 | Nam et al. | |
| 2015/0282036 A1 | 10/2015 | Yi et al. | |
| 2015/0304878 A1* | 10/2015 | Wang | H04L 5/0053 370/252 |
| 2015/0350942 A1 | 12/2015 | Wei et al. | |
| 2016/0021661 A1 | 1/2016 | Yerramalli et al. | |
| 2016/0029161 A1* | 1/2016 | Park | H04L 27/2663 455/456.2 |
| 2016/0036541 A1 | 2/2016 | Siomina et al. | |
| 2016/0241420 A1* | 8/2016 | Sorrentino | H04W 56/0015 |
| 2016/0295558 A1 | 10/2016 | Hussain et al. | |
| 2016/0337101 A1* | 11/2016 | Gao | H04L 5/0082 |
| 2016/0337157 A1* | 11/2016 | Papasakellariou | H04L 5/0053 |
| 2016/0338050 A1* | 11/2016 | Kim | H04W 4/70 |
| 2017/0005765 A1* | 1/2017 | Park | H04L 5/0048 370/336 |
| 2017/0033908 A1* | 2/2017 | Hwang | H04L 5/0016 |
| 2017/0135105 A1 | 5/2017 | Li et al. | |
| 2017/0238344 A1* | 8/2017 | McGowan | H04L 5/0007 370/329 |
| 2017/0279579 A1* | 9/2017 | Qian | H04W 72/0406 |
| 2017/0288743 A1* | 10/2017 | Nam | H04B 7/024 |
| 2017/0331670 A1* | 11/2017 | Parkvall | H04W 52/028 |
| 2018/0049068 A1 | 2/2018 | Agiwal et al. | |
| 2018/0049203 A1 | 2/2018 | Xue et al. | |
| 2018/0063820 A1* | 3/2018 | Xiong | H04W 72/042 |
| 2018/0124784 A1 | 5/2018 | Kumar et al. | |
| 2018/0131493 A1* | 5/2018 | Luo | H04L 5/0092 |
| 2018/0198581 A1* | 7/2018 | Miao | H04L 5/0091 |
| 2018/0198648 A1* | 7/2018 | Sun | H04L 25/03866 |
| 2018/0198659 A1* | 7/2018 | Ko | H04L 5/005 |
| 2018/0199299 A1* | 7/2018 | Wakabayashi | H04W 56/002 |
| 2018/0212733 A1* | 7/2018 | Khoryaev | H04W 56/0035 |
| 2018/0248736 A1* | 8/2018 | Davydov | H04W 76/27 |
| 2018/0254853 A1 | 9/2018 | Jung | H04L 5/0051 |
| 2018/0262313 A1* | 9/2018 | Nam | H04L 5/0044 |
| 2018/0270799 A1* | 9/2018 | Noh | H04L 1/1812 |
| 2018/0279363 A1* | 9/2018 | Su | H04W 72/0406 |
| 2018/0279388 A1* | 9/2018 | Miao | H04W 76/10 |
| 2018/0288746 A1 | 10/2018 | Zhang et al. | |
| 2018/0302205 A1* | 10/2018 | Abedini | H04J 11/0076 |
| 2018/0302254 A1* | 10/2018 | Yamada | H04L 27/26025 |
| 2018/0302905 A1* | 10/2018 | Fodor | H04L 27/2646 |
| 2018/0324732 A1* | 11/2018 | Park | H04L 5/0051 |
| 2019/0007923 A1 | 1/2019 | Blankenship et al. | |
| 2019/0053211 A1 | 2/2019 | Ying et al. | |
| 2019/0089560 A1* | 3/2019 | Baldemair | H04L 5/0051 |
| 2019/0140799 A1 | 5/2019 | Gao et al. | |
| 2019/0159153 A1* | 5/2019 | Li | H04L 27/26 |
| 2019/0280909 A1* | 9/2019 | Werner | H04L 27/26 |
| 2019/0281621 A1 | 9/2019 | Noh et al. | |
| 2019/0320397 A1* | 10/2019 | Tang | H04W 24/10 |
| 2019/0363851 A1* | 11/2019 | Lin | H04L 5/0051 |
| 2020/0022122 A1 | 1/2020 | Wu et al. | |
| 2020/0028646 A1 | 1/2020 | Seo et al. | |

FOREIGN PATENT DOCUMENTS

| | | |
|---|---|---|
| CN | 102957471 A | 3/2013 |
| CN | 104641707 A | 5/2015 |
| CN | 104798321 A | 7/2015 |
| CN | 105099634 A | 11/2015 |
| CN | 105103647 A | 11/2015 |
| CN | 110168992 A | 8/2019 |
| EP | 3566512 A1 | 11/2019 |
| KR | 20100117662 A | 11/2010 |
| WO | 2011075908 A1 | 6/2011 |
| WO | 2017035238 A3 | 3/2017 |
| WO | 2018126399 A1 | 7/2018 |
| WO | 2018128564 A1 | 7/2018 |

OTHER PUBLICATIONS

U.S. Appl. No. 62/501,726 (Year: 2016).*
Huawei et al., "UL DMRS design for data transmission," 3GPP TSG RAN WG1 Meeting # 88, R1-1701696, Athens, Greece, Feb. 13-17, 2017, 9 pages.
Huawei et al., "Design of DL DMRS for data transmission," 3GPP TSG RAN WG1 Meeting #88bis R1-1704233, Spokane, USA, Apr. 3-7, 2017, 6 pages.
NEC, "Considerations on the sequence design of DMRS," 3GPP TSG RAN WG1 Meeting #88bis, R1-1704601, Spokane, USA, Apr. 3-7, 2017, 3 pages.
Samsung, "Discussions on CSI-RS design for NR MIMO," 3GPP TSG RAN WG1 Meeting #89, R1-1707970, Hangzhou, China, May 15-19, 2017, 9 pages.

* cited by examiner

200

| A network device sends first indication information to a terminal device, where the first indication information is used to indicate a target resource | S210 |

| The network device sends second indication information to the terminal device, where the second indication information is used to indicate at least one of parameters of a second bandwidth | S220 |

METHOD AND APPARATUS FOR DETERMINING REFERENCE SIGNAL SEQUENCE, COMPUTER PROGRAM PRODUCT, AND COMPUTER READABLE STORAGE MEDIUM

CROSS-REFERENCE TO RELATED APPLICATIONS

This application is a continuation of U.S. patent application Ser. No. 16/204,908, filed on Nov. 29, 2018, now U.S. Pat. No. 11,258,556, issued Feb. 22, 2022, which is a continuation of International Application No. PCT/CN2018/085607, filed on May 4, 2018, which claims priority to Chinese Patent Application No. 201710313804.0, filed on May 5, 2017. All of the afore-mentioned patent applications are hereby incorporated by reference in their entireties.

TECHNICAL FIELD

This application relates to the communications field, and more specifically, to a method and an apparatus for determining a reference signal sequence, a computer program product, and a computer readable storage medium.

BACKGROUND

In a Long Term Evolution-Advanced (LTE-A) system, a supported maximum system bandwidth is 20 MHz, and corresponds to a maximum of 110 resource blocks (RB). For downlink demodulation reference signals (DMRS), reference signal sequences are generated based on a quantity of RBs of the maximum bandwidth, and a DMRS on a corresponding RB uses a corresponding reference signal sequence.

Due to insufficient capabilities of some terminal devices (for example, a relatively poor function of a radio frequency device) or another reason, these terminal devices cannot transmit data by using a maximum bandwidth, and may be capable of access only a frequency band of a relatively small bandwidth, and this bandwidth may be referred to as a component carrier (CC). In LTE-A, a CC may be considered as a serving cell, and a terminal device needs to learn only a cell bandwidth, that is, a system bandwidth of the CC. Reference signals of the terminal device on the CC are generated based on a quantity of RBs corresponding to a maximum bandwidth of LTE-A, and physical resource blocks (PRB) are numbered starting from a frequency domain start position of the CC. In the LTE-A system, the terminal device may transmit data on a plurality of CCs by using carrier aggregation (CA). In this way, a bandwidth that may be used by the terminal device to transmit data is larger, and a data transmission rate is improved.

A new-generation wireless communications system researched and developed for a 5th generation mobile communications technology (5-Generation, 5G) is referred to as new radio (NR). NR supports a larger bandwidth and more services. Because terminal devices have different capabilities, NR allows the terminal devices having the different capabilities to use CCs of different bandwidths. Some new concepts such as a bandwidth part (BP) are also proposed in NR.

Resources in NR are allocated more flexibly, and a plurality of corporations consider that more flexible multi-user multiple-input multiple-output (MU-MIMO) needs to be considered, for example, MU-MIMO performed when bandwidths accessed by a plurality of terminal devices partially overlap with each other, and MU-MIMO performed by terminal devices on a CC and a wideband CC. In NR, if MU-MIMO between a terminal device operating on a wideband (or wideband CC) and a terminal device operating on a CC or using aggregation of a plurality of CCs or a terminal device operating on a BP needs to be supported, DMRSs of the two terminal devices need to be configured to be orthogonal or quasi-orthogonal. However, in a conventional method for generating and mapping a DMRS sequence on a wideband and a CC in LTE-A, DMRSs of a user operating on a wideband and a user operating on one or more CCs cannot be configured to be orthogonal.

SUMMARY

This application provides a method for determining a reference signal sequence, a terminal device, and a network device, to determine a reference signal sequence based on parameters of a first bandwidth and parameters of a second bandwidth, so that a reference signal sequence on the first bandwidth and a reference signal sequence on the second bandwidth are the same, and the reference signal sequence on the first bandwidth and the reference signal sequence on the second bandwidth may be configured to be the same, orthogonal, or quasi-orthogonal, to support MU-MIMO between terminal devices operating on the first bandwidth and the second bandwidth.

According to a first aspect, a method for determining a reference signal sequence is provided. The method includes: receiving first indication information sent by a network device, determining a bandwidth part based on the first indication information, determining a reference signal sequence based on an offset between a frequency domain start position of the bandwidth part and a frequency domain start position of a maximum system bandwidth, and sending or receiving the reference signal sequence by using the bandwidth part.

In a possible implementation of the first aspect, the method further includes: receiving second indication information sent by the network device, and determining the frequency domain start position of the maximum system bandwidth based on the second indication information.

In a possible implementation of the first aspect, the method further includes: receiving third indication information sent by the network device, and determining the frequency domain start position of the bandwidth part based on the third indication information.

In a possible implementation of the first aspect, the determining a reference signal sequence based on an offset between a frequency domain start position of the bandwidth part and a frequency domain start position of a maximum system bandwidth includes: determining the reference signal sequence based on a subcarrier spacing and the offset between the frequency domain start position of the bandwidth part and the frequency domain start position of the maximum system bandwidth.

According to a second aspect, a method for determining a reference signal sequence is provided. The method includes: sending first indication information to a terminal device, where the first indication information is used to indicate a bandwidth part, and sending second indication information to the terminal device, where the second indication information is used to indicate a frequency domain start position of a maximum system bandwidth.

In a possible implementation of the second aspect, the method further includes: sending third indication information to the terminal device, where the third indication information is used to indicate a frequency domain start position of the bandwidth part.

In a possible implementation of the second aspect, an offset between the frequency domain start position of the bandwidth part and the frequency domain start position of the maximum system bandwidth is used by the terminal device to determine a reference signal sequence, and the reference signal sequence is sent by using the bandwidth part.

According to a third aspect, an apparatus for determining a reference signal sequence is provided, and the apparatus may be a terminal device, or may be a chip in a terminal device. The apparatus may include a processing unit and a transceiver unit. When the apparatus is a terminal device, the processing unit may be a processor, and the transceiver unit may be a transceiver, the terminal device may further include a storage unit, and the storage unit may be a memory, and the storage unit is configured to store an instruction, and the processing unit executes the instruction stored in the storage unit, so that the terminal device performs the method for determining a reference signal sequence based on the first aspect and the implementations of the first aspect. When the apparatus is a chip in a terminal device, the processing unit may be a processor, and the transceiver unit may be an input/output interface, a pin, a circuit, or the like, and the processing unit executes the instruction stored in the storage unit, so that the terminal device performs the method for determining a reference signal sequence based on the first aspect and the implementations of the first aspect. The storage unit may be a storage unit (for example, a register or a cache) in the chip, or may be a storage unit (for example, a read-only memory or a random access memory) that is in the terminal device and that is located outside the chip.

According to a fourth aspect, an apparatus for determining a reference signal sequence is provided, and the apparatus may be a network device, or may be a chip in a network device. The apparatus may include a processing unit and a transceiver unit. When the apparatus is a network device, the processing unit may be a processor, and the transceiver unit may be a transceiver, the network device may further include a storage unit, and the storage unit may be a memory, and the storage unit is configured to store an instruction, and the processing unit executes the instruction stored in the storage unit, so that the network device performs the method for determining a reference signal sequence based on the second aspect and the implementations of the second aspect. When the apparatus is a chip in a network device, the processing unit may be a processor, and the transceiver unit may be an input/output interface, a pin, a circuit, or the like, and the processing unit executes the instruction stored in the storage unit, so that the network device performs the method for determining a reference signal sequence based on the second aspect and the implementations of the second aspect. The storage unit may be a storage unit (for example, a register or a cache) in the chip, or may be a storage unit (for example, a read-only memory or a random access memory) that is in the network device and that is located outside the chip.

According to a fifth aspect, an apparatus for obtaining a resource indication value is provided. The apparatus includes a processor and a storage medium, the storage medium stores an instruction, and when the instruction is run by the processor, the processor is caused to perform the method for determining a reference signal sequence based on the first aspect and the implementations of the first aspect. The apparatus may be a chip or a chip system.

According to a sixth aspect, an apparatus for obtaining a resource indication value is provided. The apparatus includes a processor and a storage medium, the storage medium stores an instruction, and when the instruction is run by the processor, the processor is caused to perform the method for determining a reference signal sequence based on the second aspect and the implementations of the second aspect. The apparatus may be a chip or a chip system.

According to a seventh aspect, a computer program product is provided. The computer program product includes computer program code, and when the computer program code is run by a communications device, the communications device is caused to perform the method for determining a reference signal sequence based on the first aspect and the implementations of the first aspect.

According to an eighth aspect, a computer program product is provided. The computer program product includes computer program code, and when the computer program code is run by a communications device, the communications device is caused to perform the method for determining a reference signal sequence based on the second aspect and the implementations of the second aspect.

According to a ninth aspect, a computer readable storage medium is provided. The computer readable storage medium is configured to store a computer program, and the computer program includes an instruction configured to perform the method for determining a reference signal sequence based on the first aspect and the implementations of the first aspect.

According to a tenth aspect, a computer readable storage medium is provided. The computer readable storage medium is configured to store a computer program, and the computer program is configured to execute an instruction of the method for determining a reference signal sequence based on the second aspect and the implementations of the second aspect.

According to an eleventh aspect, a method for determining a reference signal sequence is provided. The method includes: receiving, by a terminal device, first indication information sent by a network device, determining, by the terminal device, a target resource based on the first indication information, determining, by the terminal device, a reference signal sequence based on parameters of a first bandwidth and parameters of a second bandwidth, and sending or receiving, by the terminal device, the reference signal sequence on the target resource.

Based on the method for determining a reference signal sequence provided in the eleventh aspect, the reference signal sequence can be determined based on the parameters of the first bandwidth and the parameters of the second bandwidth, so that a reference signal sequence on the first bandwidth and a reference signal sequence on the second bandwidth are the same, and the reference signal sequence on the first bandwidth and the reference signal sequence on the second bandwidth may be configured to be the same, orthogonal, or quasi-orthogonal, to support MU-MIMO between terminal devices operating on the first bandwidth and the second bandwidth.

In a possible implementation of the eleventh aspect, the parameters of the second bandwidth include at least one of the following parameters: a center frequency of the second bandwidth, a bandwidth value of the second bandwidth, and a frequency domain start position of the second bandwidth.

In a possible implementation of the eleventh aspect, the parameters of the first bandwidth include at least one of the following parameters: a center frequency of the first bandwidth, a bandwidth value of the first bandwidth, and a frequency domain start position of the first bandwidth.

In a possible implementation of the eleventh aspect, the method further includes: receiving, by the terminal device, second indication information sent by the network device, and determining, by the terminal device, at least one of the parameters of the second bandwidth based on the second indication information.

In a possible implementation of the eleventh aspect, the method further includes: receiving, by the terminal device, third indication information sent by the network device, and determining, by the terminal device, at least one of the parameters of the first bandwidth based on the third indication information.

In a possible implementation of the eleventh aspect, the determining, by the terminal device, a reference signal sequence based on parameters of a first bandwidth and parameters of a second bandwidth includes: determining, by the terminal device, the reference signal sequence based on a subcarrier spacing and the parameters of the first bandwidth, the parameters of the second bandwidth.

In a possible implementation of the eleventh aspect, a frequency domain of the target resource and a frequency domain of the first bandwidth are the same or partially overlap.

In a possible implementation of the eleventh aspect, the bandwidth value of the first bandwidth is less than or equal to the bandwidth value of the second bandwidth.

In a possible implementation of the eleventh aspect, the first bandwidth is any one of an operating bandwidth of the terminal device, a serving cell bandwidth, and a carrier bandwidth, and the second bandwidth is any one of a maximum system bandwidth, a cell bandwidth, and a wideband carrier bandwidth.

According to a twelfth aspect, a method for determining a reference signal sequence is provided. The method includes: sending, by a network device, first indication information to a terminal device, where the first indication information is used to indicate a target resource, and sending, by the network device, second indication information to the terminal device, where the second indication information is used to indicate at least one of parameters of a second bandwidth.

Based on the method for determining a reference signal sequence provided in the twelfth aspect, the network device sends, to the terminal device, the indication information used to indicate the parameters of the second bandwidth, and MU-MIMO between UE operating on a first bandwidth and the terminal device operating on the second bandwidth may be supported, that is, a reference signal sequence is determined based on parameters of the first bandwidth and the parameters of the second bandwidth. Finally, a reference signal sequence on the first bandwidth and a reference signal sequence on the second bandwidth are configured to be the same, orthogonal, or quasi-orthogonal, to support MU-MIMO between the terminal devices operating on the first bandwidth and the second bandwidth.

In a possible implementation of the twelfth aspect, the method further includes: sending, by the network device, third indication information to the terminal device, where the third indication information is used to indicate the parameters of the first bandwidth.

In a possible implementation of the twelfth aspect, the parameters of the second bandwidth and the parameters of the first bandwidth are used by the terminal device to determine a reference signal sequence, and the reference signal sequence is sent on the target resource.

In a possible implementation of the twelfth aspect, the parameters of the second bandwidth include at least one of the following parameters: a center frequency of the second bandwidth, a bandwidth value of the second bandwidth, and a frequency domain start position of the second bandwidth.

In a possible implementation of the twelfth aspect, the parameters of the first bandwidth include at least one of the following parameters: a center frequency of the first bandwidth, a bandwidth value of the first bandwidth, and a frequency domain start position of the first bandwidth.

In a possible implementation of the twelfth aspect, the bandwidth value of the first bandwidth is less than or equal to the bandwidth value of the second bandwidth.

In a possible implementation of the twelfth aspect, a frequency domain of the target resource and a frequency domain of the first bandwidth are the same or partially overlap.

In a possible implementation of the twelfth aspect, the first bandwidth is any one of an operating bandwidth of the terminal device, a serving cell bandwidth, and a carrier bandwidth, and the second bandwidth is any one of a maximum system bandwidth, a cell bandwidth, and a wideband carrier bandwidth.

According to a thirteenth aspect, a terminal device is provided. The terminal device includes a processor, a memory, and a transceiver that are configured to enable the terminal device to perform a corresponding function in the foregoing method. The processor, the memory, and the transceiver are connected by using communication, the memory stores an instruction, the transceiver is configured to perform specific signal receiving/transmission under driving of the processor, and the processor is configured to invoke the instruction to implement the method for determining a reference signal sequence according to the first aspect and the implementations of the first aspect.

According to a fourteenth aspect, a terminal device is provided. The terminal device includes a processing module, a storage module, and a transceiver module that are configured to enable the terminal device to perform a function of the terminal device in the first aspect or any possible implementation of the first aspect. The function may be implemented by using hardware, or may be implemented by executing corresponding software by hardware, and the hardware or software includes one or more modules corresponding to the foregoing function.

According to a fifteenth aspect, a network device is provided. The network device includes a processor, a memory, and a transceiver that are configured to enable the network device to perform a corresponding function in the foregoing method. The processor, the memory, and the transceiver are connected by using communication, the memory stores an instruction, the transceiver is configured to perform specific signal receiving/transmission under driving of the processor, and the processor is configured to invoke the instruction to implement the method for determining a reference signal sequence according to the second aspect and the implementations of the second aspect.

According to a sixteenth aspect, a network device is provided. The network device includes a processing module, a storage module, and a transceiver module that are configured to enable the network device to perform a function of the network device in the second aspect or any possible implementation of the second aspect. The function may be implemented by using hardware, or may be implemented by executing corresponding software by hardware, and the hardware or software includes one or more modules corresponding to the foregoing function.

According to a seventeenth aspect, a communications system is provided. The communications system includes the terminal device according to the third aspect and the network device according to the fourth aspect. The communications system may complete the methods for determining a reference signal sequence according to the first aspect and the second aspect.

According to an eighteenth aspect, a computer readable storage medium is provided. The computer readable storage medium is configured to store a computer program, and the computer program includes an instruction configured to perform the method according to the first aspect or any possible implementation of the first aspect.

According to a nineteenth aspect, a computer readable storage medium is provided. The computer readable storage medium is configured to store a computer program, and the computer program includes an instruction configured to perform the method according to the second aspect or any possible implementation of the second aspect.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
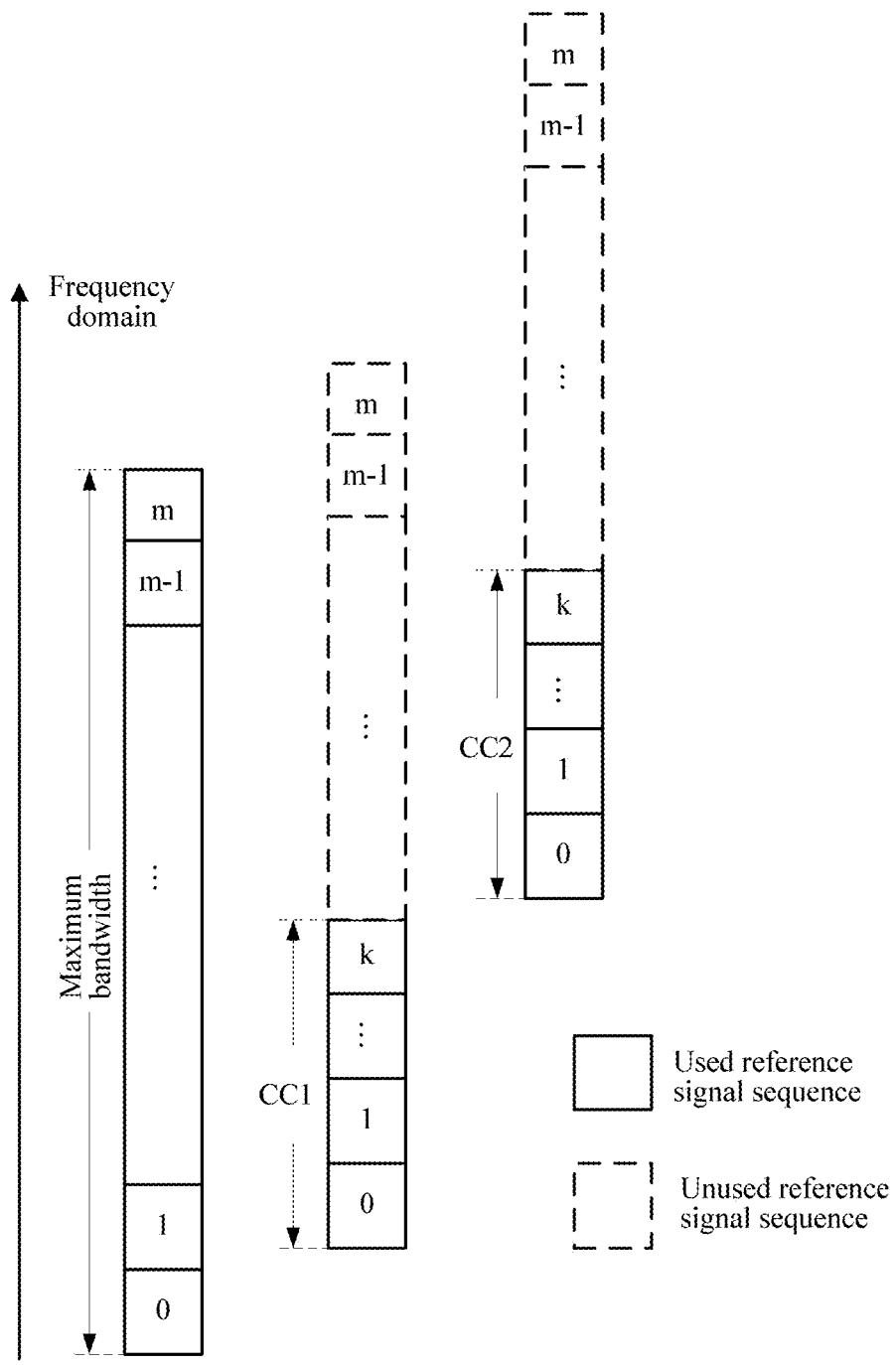
FIG. 1 is a schematic diagram of sequences of corresponding reference signals when UE accesses a CC and accesses a maximum bandwidth in the prior art.

The following describes technical solutions of this application with reference to accompanying drawings.

In an LTE-A system, a supported maximum system bandwidth is 20 MHz, and corresponds to a maximum of 110 RBs. For downlink DMRSs, reference signal sequences are generated based on a quantity of RBs of the maximum bandwidth, a DMRS on a corresponding RB uses a corresponding reference signal sequence, and a formula for generating a DMRS sequence is shown in Formula (1):

$$r(m) = \frac{1}{\sqrt{2}}(1 - 2 \cdot c(2m)) + j\frac{1}{\sqrt{2}}(1 - 2 \cdot c(2m+1)), \quad (1)$$

$$\text{where } m = \begin{cases} 0, 1, 2 \ldots 12N_{RB}^{max,DL} - 1 \\ 0, 1, 2 \ldots 16N_{RB}^{max,DL} - 1 \end{cases}$$

$$c_{init} = (\lfloor n_s/2 \rfloor + 1) \cdot (2n_{ID}^{n_{SCID}} + 1) \cdot 2^{16} + n_{SCID} \quad (2)$$

where c(m) is a pseudo-random sequence (Pseudo-random sequence, PN sequence), and a reference signal sequence r(m) is formed by the PN sequence. $c_{init}$ is an initialization value, and Formula (2) is a formula for generating the initialization value $c_{init}$. $N_{RB}^{max,DL}$ indicates 110 RBs of the downlink maximum bandwidth.

A mapping formula of an LTE downlink DMRS port (port) and a time-frequency resource is shown in Formula (3):

$$a_{k,l}^{(p)} = w_p(l') \cdot r(3 \cdot l' \cdot N_{RB}^{max,DL} + 3 \cdot n_{PRB} + m') \quad (3)$$

In Formula (3), p is an antenna port corresponding to a DMRS, k is a frequency domain subcarrier position of the DMRS mapped to the time-frequency resource, l is a time domain symbol position of the DMRS mapped to the time-frequency resource, $n_{PRB}$ is a physical resource block (PRB) number, and $w_p(l')$ is an orthogonal cover code (OCC) corresponding to a port number being p. By using the mapping formula (3), REs of different time-frequency resources (a frequency domain number is k and a time domain symbol number is L) are in a one-to-one correspondence with sequence values r(m). Based on the sequence generation formula and the mapping formula, DMRS sequence values on different RBs may be uniquely determined.

In downlink MU-MIMO of LTE-A, a plurality of terminal devices may perform MU-MIMO on a same bandwidth. To be capable of demodulating data of different users, a base station configures quasi-orthogonal or orthogonal DMRSs for a plurality of UEs. A quasi-orthogonal method is used to configure orthogonal ports for a plurality of users, to achieve orthogonality by using different OCCs. A method for configuring DMRS ports and layers (layer) in LTE-A is provided in Table 1. By configuring a corresponding configuration item for a user, a network side device can support correct demodulation of DMRSs when a plurality of users perform MU-MIMO.

TABLE 1

Configuration table of reference signal

| One code word<br>code word 0 is available<br>code word 1 is unavailable | | Two code words<br>code word 0 is available<br>code word 1 is available | |
|---|---|---|---|
| Configuration value | Information | Configuration value | Information |
| 0 | one layer, port 7, $n_{SCID} = 0$ | 0 | two layers, ports 7 and 8, $n_{SCID} = 0$ |
| 1 | one layer, port 7, $n_{SCID} = 1$ | 1 | two layers, ports 7 and 8, $n_{SCID} = 1$ |
| 2 | one layer, port 8, $n_{SCID} = 0$ | 2 | three layers, ports 7 to 9 |
| 3 | one layer, port 8, $n_{SCID} = 1$ | 3 | four layers, ports 7 to 10 |

TABLE 1-continued

Configuration table of reference signal

| One code word code word 0 is available code word 1 is unavailable | | Two code words code word 0 is available code word 1 is available | |
| --- | --- | --- | --- |
| Configuration value | Information | Configuration value | Information |
| 4 | two layers, ports 7 and 8 | 4 | five layers, ports 7 to 11 |
| 5 | three layers, ports 7 to 9 | 5 | six layers, ports 7 to 12 |
| 6 | four layers, ports 7 to 10 | 6 | seven layers, ports 7 to 13 |
| 7 | reserved | 7 | eight layers, ports 7 to 14 |

FIG. 1 is a schematic diagram of sequences of corresponding reference signals when a terminal device accesses different CCs in the prior art. As shown in FIG. 1, numbers 0, 1, 2, . . . , and m in the figure are RB numbers. At a same position of an entire frequency domain, corresponding reference signal sequences (RB numbers) are different when the terminal device accesses different CCs.

If NR needs to support MU-MIMO between terminal devices on a CC and a wideband CC or a BP, in a conventional method for generating and mapping a DMRS sequence on CCs in LTE-A, reference signals of the terminal devices on the CC and the wideband CC or BP on a same frequency band cannot be configured to be orthogonal.

Based on a problem existing in the foregoing reference signal design method in the prior art, this application provides a method for determining a reference signal sequence, to better meet a requirement of supporting MU-MIMO between a terminal device operating on a wideband (or wideband CC) and a terminal device operating on a CC or using aggregation of a plurality of CCs, or a terminal device operating on a BP in NR, so that a base station may better demodulate data of different terminal devices.

It should be understood that, the technical solutions of this application may be applied to various communications systems such as an LTE/LTE-A system, an LTE/LTE-A frequency division duplex (FDD) system, an LTE/LTE-A time division duplex (TDD) system, a Universal Mobile Telecommunications System (UMTS), a Worldwide Interoperability for Microwave Access (WiMAX) communications system, a public land mobile network (PLMN) system, a device to device (D2D) network system or machine to machine (M2M) network system, a Wireless Fidelity (Wi-Fi) system, a wireless local area network (WLAN), and a future 5G communications system.

It should be further understood that, in this embodiment of this application, a terminal device may also be referred to as user equipment (UE), a mobile station (MS), a mobile terminal, or the like, the terminal device may communicate with one or more core network devices by using a radio access network (RAN). For example, the terminal device may include various handheld devices, in-vehicle devices, wearable devices, or computing devices having a wireless communication function, or another processing device connected to a wireless modem. The terminal device may further include a user unit, a cellular phone, a smartphone, a wireless data card, a personal digital assistant (PDA) computer, a tablet computer, a wireless modem, a handheld device (handset), a laptop computer, a machine type communication (MTC) terminal, or a station (ST) in a wireless local area network (WLAN). The terminal device may be a cellular phone, a cordless telephone, a Session Initiation Protocol (SIP) telephone, a wireless local loop (WLL) station and a next-generation communications system, for example, a terminal device in a 5th generation communications (fifth-generation, 5G) network or a terminal device in a future evolved public land mobile network (PLMN) network. This embodiment of this application is not limited herein.

It should be further understood that, a base station may also be referred to as a network device, the network device may be a device configured to communicate with the terminal device, and the network device may be an evolved NodeB (eNB or eNodeB) in an LTE system, a gNB or an access point in NR, a base transceiver station, a transceiver node, an in-vehicle device, a wearable device, a network device in a future 5G network, or a network device in a future evolved PLMN system. For example, the network device may be an access point (AP) in a WLAN, or may be a base station (BTS) in Global System for Mobile Communications (GSM) or Code Division Multiple Access (CDMA). The network device may further be an evolved NodeB (eNB or eNodeB) in an LTE system. Alternatively, the network device may further be a node B (Node B) in a 3rd Generation (3G) system. Additionally, the network device may further be a relay station, an access point, an in-vehicle device, a wearable device, a network device in a future 5G network, a network device in a future evolved PLMN network, or the like. This embodiment of this application is not limited herein. For convenience of description, in all the embodiments of this application, the foregoing apparatuses providing a wireless communication function to an MS are collectively referred to as network devices.

Figure 2:
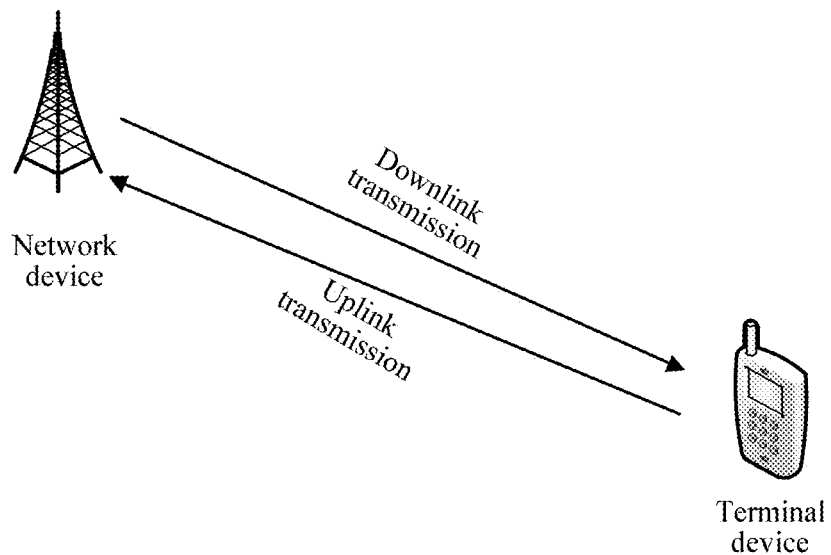
FIG. 2 is a schematic diagram of a typical application scenario according to an embodiment of this application.

FIG. 2 is a schematic diagram of a typical application scenario according to an embodiment of this application. As shown in FIG. 2, the technical solutions of this application may be applied to sending and receiving of a sequence of a reference signal during uplink and downlink data transmission between a network device and a terminal device, the reference signal may be a DMRS, a channel state information-reference signal (CSI-RS), a sounding reference signal (SRS), a phase tracking reference signal (PTRS), a cell-specific reference signal, a position reference signal, or the like, and this embodiment of this application is not limited herein.

It should be understood that, this embodiment of this application is described by using only the application scenario shown in FIG. 2 as an example, but this embodiment of this application is not limited thereto. For example, the system may include more terminal devices.

Figure 3:
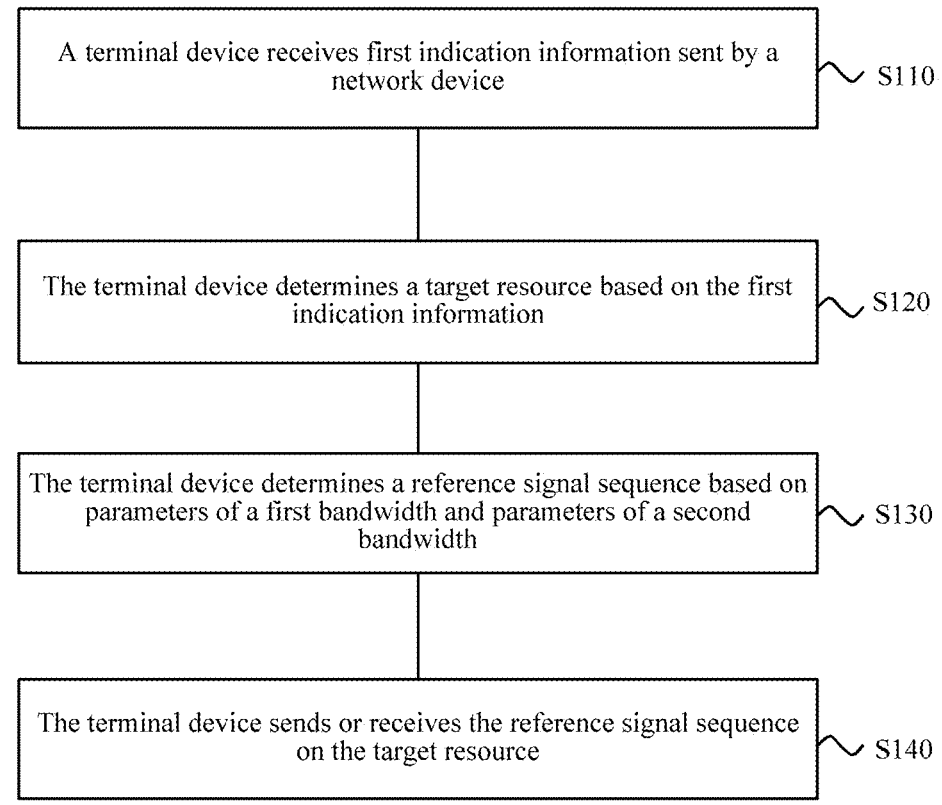
FIG. 3 is a schematic flowchart of a method for determining a reference signal sequence according to an embodiment of this application.

A method for determining a reference signal sequence provided in this application is described in detail below with reference to FIG. 3, FIG. 3 is a schematic flowchart of a method 100 for determining a reference signal sequence according to an implementation of this application, the method 100 may be applied to the scenario shown in FIG. 2, and certainly may also be applied to another communication scenario, and this embodiment of this application is not limited herein.

As shown in FIG. 3, the method 100 includes the following steps.

S110. A terminal device receives first indication information sent by a network device.

S120. The terminal device determines a target resource based on the first indication information.

S130. The terminal device determines a reference signal sequence based on parameters of a first bandwidth and parameters of a second bandwidth.

S140. The terminal device sends or receives the reference signal sequence on the target resource.

Specifically, in S110 and S120, when the terminal device needs to send data on a time-frequency resource, the terminal device also needs to send a reference signal sequence on this resource. The reference signal sequence is used by the network device to perform channel estimation, coherent detection, and demodulation, so that the network device correctly demodulates data of the terminal device. Therefore, the terminal device receives the first indication information sent by the network device, and the first indication information is used to indicate a time-frequency resource on which the terminal device sends the reference signal sequence, that is, the target resource. The terminal device may determine the target resource based on the first indication information.

Figure 4:
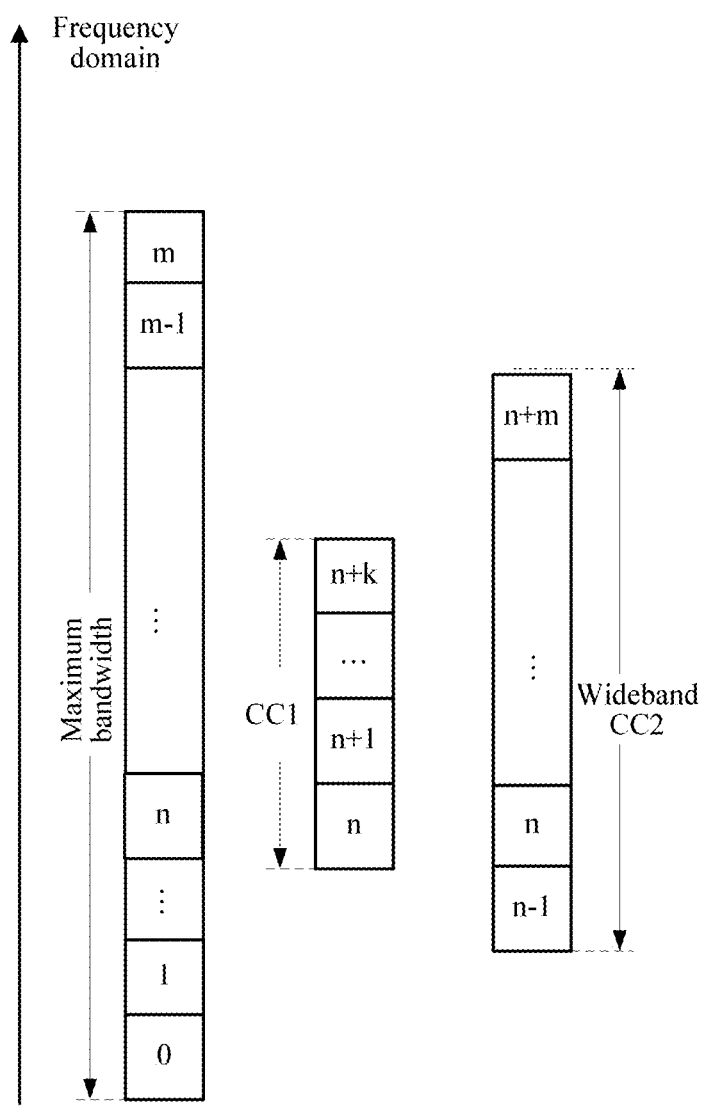
FIG. 4 is a schematic diagram of reference signal sequences of different bandwidths according to an embodiment of this application.

In S130, after the target resource is determined, the terminal device determines the reference signal sequence based on the parameters of the first bandwidth and the parameters of the second bandwidth, so that a reference signal sequence on the first bandwidth and a reference signal sequence on the second bandwidth are the same. In this way, when a plurality of terminal devices perform MU-MIMO, for example, MU-MIMO between a terminal device operating on the first bandwidth and a terminal device operating on the second bandwidth needs to be supported, because the reference signal sequence on the first bandwidth and the reference signal sequence on the second bandwidth are the same, the reference signal sequence on the first bandwidth and the reference signal sequence on the second bandwidth may be configured to be orthogonal or quasi-orthogonal, and therefore the network device may correctly parse out data of different terminal devices. Therefore, the reference signal sequence on the first bandwidth is related to the parameters of the first bandwidth and the parameters of the second bandwidth, that is, the reference signal sequence on the first bandwidth is determined based on the parameters of the first bandwidth and the parameters of the second bandwidth. FIG. 4 is a schematic diagram of reference signal sequences of different bandwidths according to an embodiment of this application. As shown in FIG. 4, a maximum bandwidth may be considered as a second bandwidth, and CC1, a wideband CC2, or a BP may be considered as a first bandwidth, or a wideband CC2, a cell bandwidth, or a maximum bandwidth may be considered as a second bandwidth, and CC1 may be considered as a first bandwidth. Numbers of CC1, the wideband CC2, and the maximum bandwidth are numbers of RBs. Because reference signal sequences of CC and the wideband CC2 are generated based on a method for generating a reference signal sequence of the maximum bandwidth, it may be learned from FIG. 4 that, for a fixed frequency domain range, reference signal sequences on the maximum bandwidth, CC1, and the wideband CC2 may be configured to be the same, orthogonal, or quasi-orthogonal (numbers of RBs are the same). When a terminal device 1 accesses CC1 and a terminal device 2 accesses the maximum bandwidth, the reference signal sequence on CC1 and the reference signal sequence on the maximum bandwidth may be configured, by using the configuration in Table 1, to be orthogonal or quasi-orthogonal. In this way, when the terminal device 1 accesses CC1 and the terminal device 2 accesses the maximum bandwidth, a network device may correctly demodulate data of different users.

It should be understood that, in an LTE/LTE-A system, that is, if a plurality of terminal devices do not perform MU-MIMO, the method for determining a reference signal sequence provided in this embodiment of this application may also be applicable, and this embodiment of this application is not limited herein.

In S140, after determining the reference signal sequence, the terminal device sends or receives the reference signal sequence on the target resource, where the reference signal sequence is used to demodulate data of different users.

It should be understood that, the target resource is a resource allocated by the network device to the terminal device, and the terminal device may send or receive data on the target resource. A frequency domain of the target resource and a frequency domain of the first bandwidth may be the same or partially overlap. The frequency domain of the target resource may further be a part of a frequency domain of the second bandwidth, or a part of the frequency domain of the first bandwidth. This embodiment of this application is not limited herein.

Optionally, in an embodiment, the first bandwidth may include any one of an operating bandwidth of the terminal device, a cell bandwidth serving the terminal device, and a carrier bandwidth. For example, the first bandwidth may be a CC, a plurality of CCs after carrier aggregation, a BP, a cell bandwidth, a maximum system bandwidth, or the like. The second bandwidth may include any one of a maximum system bandwidth, a cell bandwidth, and a wideband carrier bandwidth. The frequency domain of the first bandwidth may be a part of the frequency domain of the second bandwidth, or the frequency domain of the first bandwidth and a part of the frequency domain of the second bandwidth overlap, and a bandwidth value of the first bandwidth may be less than or equal to a bandwidth value of the second bandwidth. This embodiment of this application is not limited herein.

For example, the first bandwidth may be a CC, the CC may be a serving cell bandwidth, a continuous frequency domain resource in a cell transmission bandwidth, a discontinuous frequency domain resource in a cell transmission bandwidth, or the like, and this embodiment of this application is not limited herein.

For example, the first bandwidth may be a bandwidth part (BP), the BP is a continuous resource in frequency domain, and one BP may include K continuous subcarriers, where K is an integer greater than 0, one BP may include frequency domain resources on which N non-overlapping continuous PRBs is located, where N is an integer greater than 0, and a subcarrier spacing of the PRB is 15 k, 30 k, 60 k, or another subcarrier spacing, or one BP includes frequency domain resources on which N non-overlapping continuous PRB groups is located, and one PRB group includes M continuous PRBs, where N and M are integers greater than 0, and a subcarrier spacing of the PRB is 15 k, 30 k, 60 k, or another subcarrier spacing. For one terminal device, a length of a BP may be less than or equal to a maximum bandwidth supported by the terminal device, and this embodiment of this application is not limited herein.

It should be understood that, the first bandwidth may further be a bandwidth formed by aggregating CCs based on CA, and this embodiment of this application is not limited herein.

It should be further understood that, the first bandwidth may further include another type of bandwidth, the second bandwidth may also include another type of bandwidth, and this embodiment of this application is not limited herein.

Based on the method for determining a reference signal sequence provided in this embodiment of this application, the reference signal sequence can be determined based on the parameters of the first bandwidth and the parameters of the second bandwidth, so that a reference signal sequence on the first bandwidth and a reference signal sequence on the second bandwidth are the same. When different terminal devices respectively access the first bandwidth and the second bandwidth to perform MU-MIMO, the reference signal sequence on the first bandwidth and the reference signal sequence on the second bandwidth may be configured to be orthogonal or quasi-orthogonal. In this way, data of the different terminal devices may be correctly demodulated, improving user experience.

Optionally, in an embodiment, the parameters of the second bandwidth include at least one of the following parameters: a center frequency of the second bandwidth, a bandwidth value of the second bandwidth, and a frequency domain start position of the second bandwidth.

Optionally, in an embodiment, the parameters of the first bandwidth include at least one of the following parameters: a center frequency of the first bandwidth, a bandwidth value of the first bandwidth, and a frequency domain start position of the first bandwidth.

Specifically, the terminal device obtains the parameters of the first bandwidth accessed by the terminal device, and the parameters may be, for example, the center frequency of the first bandwidth and the bandwidth value of the first bandwidth. Likewise, after the terminal device also obtains the parameters of the second bandwidth, a method for generating a reference signal on the first bandwidth may be the same as or different from a method for generating a reference signal on the second bandwidth, or a length of the reference signal sequence generated on the first bandwidth and the second bandwidth needs to be generated based on a maximum value of the two bandwidths or another larger bandwidth value. Reference signal sequences of an overlapping part of the first bandwidth and the second bandwidth in frequency domain may be configured to be the same, orthogonal, or quasi-orthogonal. Because the frequency domain start position of the first bandwidth and the frequency domain start position of the second bandwidth may be different, it may be considered that the frequency domain start position of the first bandwidth has an offset value relative to the frequency domain start position of the second bandwidth, and corresponding to a mapping formula of a reference signal sequence, a mapping formula of the reference signal sequence on the first bandwidth has an offset value relative to a mapping formula of the reference signal sequence on the second bandwidth. The offset value is related to the parameters of the first bandwidth and the parameters of the second bandwidth.

An NR standard has agreed that for a subcarrier spacing, a maximum quantity of subcarriers of each NR carrier is 3300 or 6600. Therefore, lengths of reference signal sequences on all wideband CCs or CCs (or BPs) on one carrier are generated based on a maximum bandwidth or a maximum quantity of subcarriers. Using a method for generating a DMRS sequence in LTE as an example, Formula (4) is used in each method for generating a sequence of a reference signal on different CCs and wideband CCs or a full bandwidth:

$$r(m) = \frac{1}{\sqrt{2}}(1 - 2 \cdot c(2m)) + j\frac{1}{\sqrt{2}}(1 - 2 \cdot c(2m+1)), \quad (4)$$

where $m = 0, 1, 2 \ldots A \cdot N_{RB}^{max,DL}$

In Formula (4), $N_{RB}^{max,DL}$ indicates a maximum bandwidth value, and because DMRS design of NR may be different from that of LTE, a front constant value is replaced with A. Because bandwidths and maximum bandwidths (or maximum quantities of subcarriers) of different cells may be different, and a bandwidth that may be used by a cell may be less than a maximum bandwidth, $N_{RB}^{max,DL}$ in the formula may further indicate a bandwidth of a cell, a wideband bandwidth, a bandwidth after aggregation of a plurality of CCs, a wideband BP bandwidth, or the like. That is, a generated length of a reference signal sequence on a CC or a BP may be generated based on a bandwidth such as a maximum bandwidth, a cell bandwidth, or a wideband. It should be understood that, Formula (4) is described by using only the method for generating a DMRS sequence in LTE as an example. In this embodiment of this application, a method for generating a corresponding reference signal sequence NR may be further determined by using another method for generating a reference signal sequence, and this embodiment of this application is not limited herein.

For a mapping formula of a reference signal, description is performed by using a DMRS as an example, and it is mentioned above that, a mapping formula of a DMRS port and a time-frequency resource is Formula (3):

$$a_{k,l}^{(p)} = w_p(l') \cdot r(3 \cdot l' \cdot N_{RB}^{max,DL} + 3n_{PRB} + m') \quad (3)$$

It needs to be ensured that the reference signal sequences of the overlapping part of the first bandwidth and the second bandwidth in frequency domain may be configured to be the same, orthogonal, or quasi-orthogonal. A DMRS needs to have an offset value (offset) in the mapping formula on the first bandwidth, and the offset value is shown in Formula (5) or Formula (6):

$$a_{k,l}^{(p)} = w_p(l') \cdot r(3 \cdot l' \cdot N_{RB}^{max,DL} + 3 \cdot n_{PRB} + m' + \text{offset1}) \quad (5)$$

$$a_{k,l}^{(p)} = w_p(l') \cdot r(3 \cdot l' \cdot N_{RB}^{max,DL} + 3 \cdot (n_{PRB} + \text{offset2}) + m') \quad (6)$$

A relationship between offset1 in Formula (5) and offset2 in Formula (6) is offset1=3 offset2. The relationship between offset1 and offset2 is related to design of a specific DMRS format, and because an actual DMRS format affects a time-frequency resource position to which a DMRS sequence is mapped, a corresponding used mapping formula is different.

Formula (5) or Formula (6) is a mapping formula of a DMRS on the first bandwidth, and if Formula (5) or Formula (6) is determined, the reference signal sequence on the first bandwidth is determined. In this way, when different terminal devices respectively access the first bandwidth and the second bandwidth to perform MU-MIMO, the reference signal sequence on the first bandwidth is mapped by using Formula (5) or Formula (6), so that the reference signal sequence on the first bandwidth and the reference signal sequence on the second bandwidth are the same. In this way, by using configuration of the network device, the reference signal sequence on the first bandwidth and the reference signal sequence on the second bandwidth may be configured to be orthogonal or quasi-orthogonal, and the network device may correctly parse out data sent by each terminal device.

It should be understood that, Formula (5) and Formula (6) use only the DMRS mapping formula of LTE as an example, and in this embodiment of this application, adding an offset value to the mapping formula of the first bandwidth is also applicable to another DMRS format and a corresponding mapping formula.

Therefore, as long as an offset value of a frequency domain start position of the first bandwidth relative to that of the second bandwidth can be determined, the reference signal sequence on the first bandwidth may be made the same as the reference signal sequence on the second bandwidth by using respective mapping formulas, and therefore the reference signal sequence on the first bandwidth and the reference signal sequence on the second bandwidth may be configured to be orthogonal or quasi-orthogonal.

Figure 5:
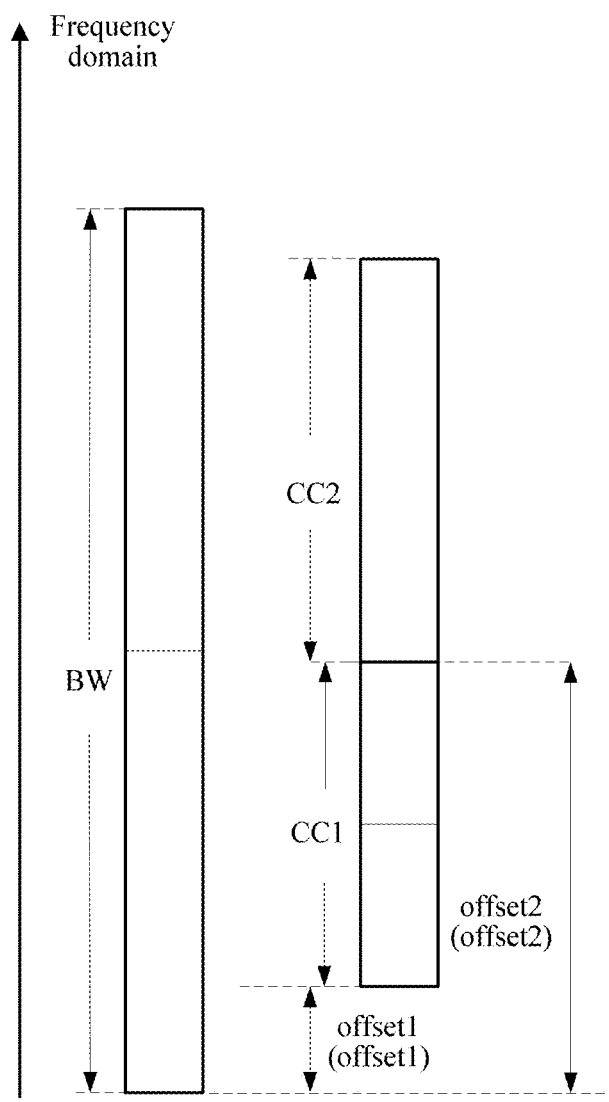
FIG. 5 is a schematic diagram of determining an offset value according to an embodiment of this application.

For example, the terminal device may determine a frequency domain start position f1 of the first bandwidth based on the center frequency of the first bandwidth and the bandwidth value of the first bandwidth, and may determine a frequency domain start position f of the second bandwidth based on the center frequency of the second bandwidth and the bandwidth value of the second bandwidth. Therefore, a frequency domain offset value of the first bandwidth relative to the second bandwidth is f-f1. The terminal device determines, based on a parameter configuration (numerology) used on the second bandwidth at a current moment or a subcarrier spacing, a frequency domain length of an RB under the subcarrier spacing, may work out an RB quantity N corresponding to f-f1, and may determine that an offset value is N. As shown in FIG. 5, FIG. 5 is a schematic diagram of determining an offset value according to an embodiment of this application. In FIG. 5, a bandwidth (BW) may be considered as a second bandwidth, and CC1 or CC2 is independently considered as a first bandwidth, or CC1 and CC2 may be considered as a wideband CC formed by using carrier aggregation, and the wideband CC may be considered as a first bandwidth. Numbers of CC1, CC2, and the BW are RB numbers. For example, an offset value offset1 of CC1 relative to the BW may be determined based on a frequency domain start position and a bandwidth value of CC1, and a frequency domain start position and a bandwidth value of the BW. Likewise, an offset value offset2 of CC2 relative to the BW may also be determined.

Optionally, in an embodiment, in S130, the determining, by the terminal device, a reference signal sequence based on parameters of a first bandwidth and parameters of a second bandwidth includes determining, by the terminal device, the reference signal sequence based on a subcarrier spacing and the parameters of the first bandwidth, the parameters of the second bandwidth.

Specifically, at different moments, numerologies or subcarrier spacings may be different, and frequency domain lengths of an RB that correspond to different numerologies or subcarrier spacings are also different. Therefore, when numerologies or subcarrier spacings used at different moments are different, the offset value needs to be determined based on a numerology or a subcarrier spacing at a current moment, thereby determining a reference signal sequence, that is, the offset value needs to be determined based on the numerology or the subcarrier spacing at the current moment.

It should be further understood that, the offset value is related to an offset value of the frequency domain of the first bandwidth relative to that of the second bandwidth. If an offset value of the frequency domain start position of the first bandwidth relative to the frequency domain start position of the second bandwidth is N RBs, the offset value is equal to N. An RB quantity of the offset value is calculated based on a subcarrier spacing on the carrier and a quantity of subcarriers in an RB. In this way, it may be ensured that regardless of whether the terminal device accesses the first bandwidth or the second bandwidth, if used OCCs and sequence initialization values are the same, corresponding used reference signal sequences are the same as long as a frequency domain position is fixed.

It should be further understood that, a method for determining a reference signal sequence on a CC is provided above. The terminal device may further access a plurality of CCs by using CA, and reference signals on other CCs may also be determined based on a similar method. For example, the terminal device accesses CC1, CC2, CC3, and the like, each of CC1, CC2, and CC3 may be considered as the first bandwidth. When the terminal device accesses a plurality of CCs, a CC may be considered as a CC of a primary cell, and other CCs are CCs of a secondary cell. When a synchronization signal detected by the terminal device is a synchronization signal of the CC of the primary cell, if CC1 is the CC of the primary cell, after determining a center frequency and a bandwidth of CC1 and accessing CC1, the terminal device may receive indication information sent by the network device, determine frequency domain offset values of CC2 and CC3 relative to CC1 based on the indication information, and then determine, based on related parameters of CC1 and the second bandwidth, values of offset2 and offset3 of reference signal sequences on CC2 and CC3 relative to the second bandwidth.

Figures 6, 7:
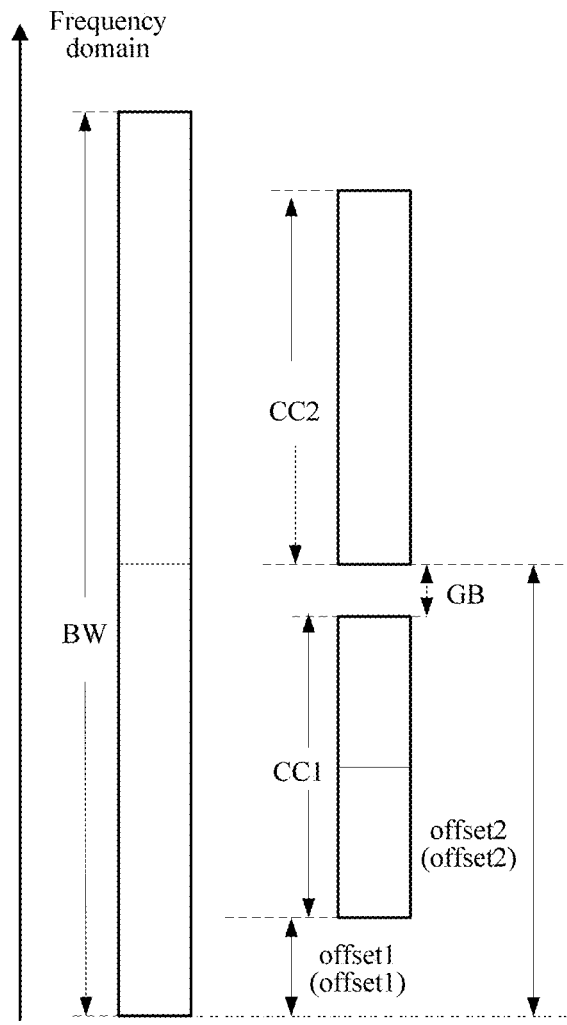
FIG. 6 is a schematic diagram of determining an offset value according to another embodiment of this application.
FIG. 7 is a schematic flowchart of a method for determining a reference signal sequence according to another embodiment of this application.

It should be further understood that, in a case of using CA, whether there is a guard bandwidth between CCs further needs to be considered. In LTE or NR, some blank subcarriers are used between different CCs to serve as a guard bandwidth. FIG. 6 is a schematic diagram of determining an offset value according to another embodiment of this application. As shown in FIG. 6, in NR or LTE, if a guard bandwidth of N subcarriers exists between CCs, when an offset value of a reference signal sequence of each CC is calculated, a frequency domain length of the guard bandwidth (GB) between the CCs needs to be taken into account.

It should be further understood that, only a method for mapping a reference signal sequence similar to that in LTE is used as an example in this embodiment of this application, but the embodiments of this application may further include another method for mapping a reference signal sequence. Moreover, the essence of the method of the embodiments of this application is likewise applicable to another reference sequence having a similar sequence generating and mapping rule, for example, another uplink or downlink reference signal sequence, as long as mapping of the reference signal is related to a number of an RB of the foregoing terminal device. This embodiment of this application is not limited herein.

It should be further understood that, the parameters of the second bandwidth and the parameters of the first bandwidth may further include other parameters, and this embodiment of this application is not limited herein.

Optionally, in an embodiment, the method 100 further includes receiving, by the terminal device, second indication information sent by the network device and determining, by the terminal device, at least one of the parameters of the second bandwidth based on the second indication information.

Specifically, in a process of initially accessing the first bandwidth, the terminal device detects a synchronization signal of the first bandwidth. After the synchronization signal is determined, because the synchronization signal is on the center frequency of the first bandwidth, the synchronization signal is detected, and the center frequency of the first bandwidth can be determined. Then, the parameters of the first bandwidth are obtained based on broadcast information of the network device.

For the parameters of the second bandwidth, the terminal device receives the second indication information sent by the network device, and the second indication information is used by the terminal device to determine at least one of the parameters of the second bandwidth that may be, for example, at least one of the bandwidth value of the second bandwidth, the frequency domain start position of the second bandwidth, and the center frequency of the second bandwidth of the parameters of the second bandwidth.

After obtaining the parameters of the first bandwidth and the parameters of the second bandwidth, the terminal device may determine an offset value of the frequency domain of the first bandwidth relative to the frequency domain of the second bandwidth based on the information, determine the mapping formula of the reference signal sequence on the first bandwidth by using Formula (5) or Formula (6), and finally determine the reference signal sequence on the first bandwidth.

It should be understood that, the network device may predefine M (M≥1) second bandwidths. For example, the second bandwidth may include one or more of bandwidths such as a maximum bandwidth, a cell bandwidth, a wideband CC, a bandwidth after aggregation of a plurality of CCs, and a wideband BP. The network device may notify, by using the second indication information of $\log_2 M$ bits, the terminal device of the parameters of the second bandwidth. This embodiment of this application is not limited herein.

It should be further understood that, the network device may not predefine the parameters of the second bandwidth. In this case, the network device may send all possible parameter values of the second bandwidth to the terminal device by using the indication information, and this embodiment of this application is not limited herein.

It should be further understood that, when the terminal device determines the frequency domain start position of the second bandwidth by using the second indication information, the network device may configure a frequency domain start position of a second bandwidth for the terminal device, this is equivalent to that the network device configures a virtual bandwidth, and the virtual bandwidth and the actual second bandwidth may be different or the same. In this case, a length of the reference signal sequence is related to the frequency domain start position of the virtual bandwidth, and a generation length of a reference signal sequence on a wideband, a wideband CC, or a BP on which a terminal device accessing the CC to perform MU-MIMO is located is also related to the frequency domain start position of the virtual bandwidth, otherwise, on a same frequency domain, values of reference signal sequences of terminal devices accessing a CC and accessing a wideband may still be different, and cannot be configured to be orthogonal. The network device may also predefine one or more virtual bandwidths, and configure one of the virtual bandwidths for the terminal device, the terminal device determines a frequency domain start position of a second bandwidth by using a virtual bandwidth and a center frequency of the second bandwidth, and then calculates a frequency domain offset of a frequency domain start position of a CC relative to a start position of the virtual bandwidth, and a generation length of a reference signal sequence on the CC may also be generated based on a length of the virtual bandwidth.

Optionally, a resource used to carry the second indication information includes: any one of a broadcast message, Radio Resource Control (RRC) signaling, a synchronization signal, a synchronization signal block, a Media Access Control control element (MAC CE), and downlink control information (DCI).

It should be understood that, the broadcast message may be a master information block (MIB) or a system information block (SIB), and may further be another type of broadcast message, and this embodiment of this application is not limited herein.

Specifically, the terminal device receives the second indication information sent by the network device, and the second indication information may be carried in any one of broadcast signaling, higher layer signaling, and physical signaling, and is used to notify the terminal device of the parameters of the second bandwidth. For example, the terminal device may receive the second indication information on signaling such as UE-specific signaling, UE group specific signaling, cell specific signaling, or group common signaling.

It should be understood that, the resource used to carry the second indication information may be further another resource or another signaling, and this embodiment of this application is not limited herein.

It should be further understood that, the terminal device may further determine other parameters of the second bandwidth by using the second indication information, and this embodiment of this application is not limited herein.

Optionally, in an embodiment, the method 100 further includes receiving, by the terminal device, third indication information sent by the network device, and determining, by the terminal device, at least one of the parameters of the first bandwidth based on the third indication information.

Specifically, in a process of initially accessing the second bandwidth, the terminal device detects a synchronization signal of the second bandwidth. After the synchronization signal is determined, because the synchronization signal is on the center frequency of the second bandwidth, the synchronization signal is detected, and the center frequency of the second bandwidth can be determined. Then, the parameters of the second bandwidth are learned based on broadcast information of the network device.

For the parameters of the first bandwidth, the terminal device receives the third indication information sent by the network device, and the third indication information is used by the terminal device to determine at least one of the parameters of the first bandwidth that may be, for example, the bandwidth value of the first bandwidth, the frequency domain start position of the first bandwidth, and the center frequency of the first bandwidth.

After obtaining the parameters of the first bandwidth and the parameters of the second bandwidth, the terminal device may determine an offset value of the frequency domain of the first bandwidth relative to the frequency domain of the second bandwidth based on the information, determine the mapping formula of the reference signal sequence on the first bandwidth by using Formula (5), and finally determine the reference signal sequence on the first bandwidth.

It should be understood that, the terminal device may further obtain the parameters of the first bandwidth and the parameters of the second bandwidth by using another method, and this embodiment of this application is not limited herein.

It should be further understood that, the network device may predefine M (M≥1) first bandwidths. For example, the first bandwidth may include one or more of bandwidths such as a CC, a BP, and a wideband bandwidth. The network device may notify, by using the third indication information of $\log_2 M$ bits, the terminal device of the parameters of the first bandwidth. This embodiment of this application is not limited herein.

It should be further understood that, the network device may not predefine the parameters of the first bandwidth. In this case, the network device may send all possible parameter values to the terminal device by using the third indication information, and this embodiment of this application is not limited herein.

Optionally, a resource used to carry the third indication information includes: any one of a broadcast message, RRC signaling, a synchronization signal, a synchronization signal block, a MAC CE, and DCI.

Specifically, the terminal device receives the third indication information sent by the network device, and the third indication information may be carried in any one of broadcast signaling, higher layer signaling, and physical signaling, and is used to notify the terminal device of information about the parameters of the second bandwidth. For example, the terminal device may receive the third indication information on signaling such as UE-specific signaling, UE group specific signaling, cell specific signaling, or group common signaling.

It should be understood that, the resource used to carry the third indication information may be further another resource or another signaling, and this embodiment of this application is not limited herein.

It should be further understood that, the terminal device may further determine other parameters of the first bandwidth by using the third indication information, and this embodiment of this application is not limited herein.

Optionally, the terminal device may further determine an offset value of the frequency domain of the first bandwidth relative to that of the second bandwidth by using the second indication information. For example, a frequency domain resource element may be used as a basic unit, and a method for notifying the offset value may be notifying that the offset value is N times the frequency domain resource element. The frequency domain resource element may be an RB, a PRB, a resource block group (RBG), a precoding resource block group (PRG), or the like. The frequency domain resource element may have a plurality of candidate values and is designated by the network device, or selection of the frequency domain resource element is related to an identifier of a CC or a wideband CC. The terminal device determines an offset value based on indication information of the network device and a size of a frequency domain of an RB in a system in which the terminal device is currently located. This embodiment of this application is not limited herein.

It should be understood that, the terminal device accessing the first bandwidth and the terminal device accessing the second bandwidth may further adjust an offset value in a reference signal mapping formula by using a third bandwidth as a reference. For example, the first bandwidth is a CC, the second bandwidth is a wideband CC, and the third bandwidth may be a cell bandwidth or a maximum system bandwidth. Both a bandwidth of the CC and a bandwidth of the wideband CC are a part of the cell bandwidth or the maximum system bandwidth. In this case, both the terminal device accessing the first bandwidth and the terminal device accessing the second bandwidth may calculate a frequency domain offset value of the first bandwidth relative to the third bandwidth and a frequency domain offset value of the second bandwidth relative to the third bandwidth by using a frequency domain start position of the third bandwidth as a reference, and then may obtain an offset value to which a reference signal on the first bandwidth is mapped and an offset value to which a reference signal on the second bandwidth is mapped. In the method, the terminal device on the first bandwidth and the terminal device on the second bandwidth may be likewise configured to perform MU-MIMO as long as that the third bandwidth is greater than the first bandwidth and the second bandwidth is satisfied. This embodiment of this application is not limited herein.

It should be further understood that, in this embodiment of this application, the foregoing method for determining a reference signal sequence not only may satisfy that different terminal devices on a CC, a wideband CC, a BP, and a cell bandwidth perform MU-MIMO, but also may satisfy that different terminal devices on a maximum system bandwidth and the like perform MU-MIMO. In a new wireless communications system, each reference signal may also be determined based on the method provided in this application. This embodiment of this application is not limited herein.

It should be further understood that, in this embodiment of this application, the offset value may further be 0, and if MU-MIMO between users among a CC, a wideband CC, a BP, a cell bandwidth, and a maximum system bandwidth does not need to be supported, each offset value offset in the foregoing formula for mapping a reference signal on a bandwidth may be 0. Therefore, the network device may further indicate, based on whether a terminal device on the first bandwidth (a CC, a BP, a wideband CC, or the like) and a terminal device on another bandwidth perform MU-MIMO, whether the terminal devices use the technical solution of this application, that is, indicate an offset value offset to which a reference signal is mapped is 0 or is related to parameters such as the first bandwidth and the second bandwidth. The terminal device may determine, based on indication information sent by the network device, whether the offset value to which the reference signal is mapped is 0 or needs to be calculated based on the parameters such as the first bandwidth and the second bandwidth. The network device may indicate, by using the indication information such as indication information indicating that the network device uses X (X≥1) bits, that at a moment or in a period of time, an offset in the mapping formula is set to 0, or the network device may determine, by using the indication information, that the terminal device needs to calculate the offset value in the mapping formula. When having not received indication information of a network side device, the terminal device may use the solution in the prior art (that is, an offset value is 0) or the solution of this application (an offset value is calculated based on the parameters such as the first bandwidth and the second bandwidth) by default. This embodiment of this application is not limited herein.

It should be further understood that, sequence numbers of the foregoing processes do not mean execution orders in this embodiment of this application. The execution orders of the processes should be determined based on functions and internal logic of the processes, and should not be construed as any limitation on the implementation processes of the embodiments of this application.

Based on the method for determining a reference signal sequence provided in this embodiment of this application, after determining the parameters of the second bandwidth based on the indication information sent by the network device, the terminal device determines the reference signal sequence based on the parameters of the second bandwidth and the parameters of the first bandwidth, so that the reference signal sequence on the first bandwidth and the reference signal sequence on the second bandwidth may be configured to be the same, orthogonal, or quasi-orthogonal. When different terminal devices respectively access the first bandwidth and the second bandwidth to perform MU-MIMO, the reference signal sequence on the first bandwidth and the reference signal sequence on the second bandwidth may be configured to be orthogonal or quasi-orthogonal, to support MU-MIMO between the terminal devices operating on the first bandwidth and the second bandwidth. User experience is improved.

This application further provides a method 200 for determining a reference signal sequence, and the method 200 may be performed by a network device. FIG. 7 is a schematic flowchart of the method 200 for determining a reference signal sequence according to an embodiment of this application. As shown in FIG. 7, the method 200 includes the following steps.

S210. A network device sends first indication information to a terminal device, where the first indication information indicates a target resource.

S220. The network device sends second indication information to the terminal device, where the second indication information is used to indicate at least one of parameters of a second bandwidth.

Specifically, in S210, when the terminal device needs to send data on a time-frequency resource, the network device sends the first indication information to the terminal device, the first indication information is used to indicate a particular time-frequency resource to the terminal device, that is, the target resource, the target resource is a resource allocated by the network device to the terminal device, and the terminal device may send or receive data on the target resource. The terminal device may send a reference signal sequence on the target resource, and the reference signal sequence is used by the network device to correctly perform channel estimation, coherent detection, and demodulation, so that the network device correctly demodulates data of the terminal device.

In S220, because NR needs to support MU-MIMO between a terminal device operating on a wideband (or a wideband CC) or a BP and a terminal device operating on a CC or using aggregation of a plurality of CCs, the network device needs to demodulate data sent by different terminal devices. In this case, reference signal sequences sent by the different terminal devices need to be configured to be orthogonal or quasi-orthogonal.

When MU-MIMO between the terminal device operating on the first bandwidth and the terminal device operating on the second bandwidth is supported, and when the terminal device accesses the first bandwidth, the reference signal sequence needs to be determined based on the parameters of the first bandwidth and the parameters of the second bandwidth, and the reference signal sequence is sent on the target resource. Therefore, the reference signal sequence on the first bandwidth and the reference signal sequence on the second bandwidth may be configured to be the same, orthogonal, or quasi-orthogonal, and MU-MIMO between the terminal devices operating on the first bandwidth and the second bandwidth may be supported. Therefore, the network device sends the second indication information to the terminal device, and the second indication information is used by the terminal device to determine the parameters of the second bandwidth.

When the terminal device accesses the first bandwidth, the terminal device detects a synchronization signal of the first bandwidth. After the synchronization signal is determined, because the synchronization signal is on the center frequency of the first bandwidth, the synchronization signal is detected, and the center frequency of the first bandwidth can be determined. Then, the network device notifies other parameters of the first bandwidth by using broadcast information. For the parameters of the second bandwidth, the network device sends the second indication information to the terminal device, and the second indication information is used by the terminal device to determine at least one of the parameters of the second bandwidth that may be, for example, at least one of a bandwidth value of the second bandwidth, a frequency domain start position of the second bandwidth, and a center frequency of the second bandwidth.

Based on the method for determining a reference signal sequence provided in this embodiment of this application, the network device sends, to the terminal device, the indication information used to indicate the parameters of the second bandwidth, and MU-MIMO between the terminal device operating on the first bandwidth and the terminal device operating on the second bandwidth may be supported, that is, a reference signal sequence is determined based on parameters of the first bandwidth and the parameters of the second bandwidth. Finally, a reference signal sequence on the first bandwidth and a reference signal sequence on the second bandwidth are configured to be the same, orthogonal, or quasi-orthogonal, and MU-MIMO between the terminal devices operating on the first bandwidth and the second bandwidth may be supported. The network device may correctly parse data in different terminal devices.

It should be understood that, the target resource is a resource allocated by the network device to the terminal device, and the terminal device may send or receive data on the target resource. A frequency domain of the target resource and a frequency domain of the first bandwidth may be the same or partially overlap. The frequency domain of the target resource may further be a part of a frequency domain of the second bandwidth, or a part of the frequency domain of the first bandwidth. This embodiment of this application is not limited herein.

It should be further understood that, the first bandwidth may include either of an operating bandwidth of the terminal device and a cell bandwidth serving the terminal device. For example, the first bandwidth may be a CC or a BP. The second bandwidth may include any one of a maximum system bandwidth, a cell bandwidth, and a wideband carrier bandwidth. The frequency domain of the first bandwidth may be a part of the frequency domain of the second bandwidth, and the bandwidth value of the first bandwidth may be less than the bandwidth value of the second bandwidth. This embodiment of this application is not limited herein.

Optionally, a resource used to carry the second indication information includes: any one of a broadcast message, RRC signaling, a synchronization signal, a synchronization signal block, a MAC CE, and DCI.

Specifically, when the network device sends the second indication information to the terminal device, the second indication information may be carried in any one of broadcast signaling, higher layer signaling, and physical signaling, and is used to notify the terminal device of information about the parameters of the second bandwidth. For example, the network device may carry the second indication information by using signaling such as UE-specific signaling, UE group specific signaling, cell specific signaling, or group common signaling.

It should be understood that, the resource used to carry the second indication information may be further another resource or another signaling, and this embodiment of this application is not limited herein.

It should be further understood that, the network device may further notify other parameters of the second bandwidth by using the second indication information, and this embodiment of this application is not limited herein.

It should be further understood that, the network device may predefine M (M≥1) second bandwidths. For example, the second bandwidth may include one or more of bandwidths such as a maximum bandwidth, a cell bandwidth, a wideband bandwidth, a bandwidth after aggregation of a plurality of CCs, and a wideband BP. The network device may notify, by using the second indication information of $\log_2 M$ bits, the terminal device of at least one of the parameters of the second bandwidth. This embodiment of this application is not limited herein.

It should be further understood that, the network device may not predefine the parameters of the second bandwidth. In this case, the network device may send all possible parameter values to the terminal device by using the indication information, and this embodiment of this application is not limited herein.

Optionally, in an embodiment, the method 200 further includes sending, by the network device, third indication information to the terminal device, where the third indication information is used to indicate at least one of parameters of a first bandwidth.

Specifically, when the terminal device accesses the second bandwidth, the terminal device detects a synchronization signal of the second bandwidth. After the synchronization signal is determined, because the synchronization signal is on the center frequency of the second bandwidth, the synchronization signal is detected, and the center frequency of the second bandwidth can be determined. Then, the network device notifies other parameters of the second bandwidth by using broadcast information. For the parameters of the first bandwidth, the network device sends the third indication information to the terminal device, and the third indication information is used by the terminal device to determine at least one of the parameters of the first bandwidth that may be, for example, the bandwidth value of the first bandwidth, the frequency domain start position of the first bandwidth, and the center frequency of the first bandwidth.

Optionally, a resource used to carry the third indication information includes: any one of a broadcast message, RRC signaling, a synchronization signal, a synchronization signal block, a MAC CE, and DCI.

Specifically, when the network device sends the third indication information to the terminal device, the third indication information may be carried in any one of broadcast signaling, higher layer signaling, and physical signaling, and is used to notify the terminal device of information about the parameters of the first bandwidth. For example, the network device may carry the third indication information by using signaling such as UE-specific signaling, UE group specific signaling, cell specific signaling, or group common signaling.

It should be understood that, the resource used to carry the third indication information may be further another resource or another signaling, and this embodiment of this application is not limited herein.

It should be further understood that, the network device may further notify information about other parameters of the first bandwidth by using the third indication information, and this embodiment of this application is not limited herein.

It should be further understood that, the network device may predefine M (M≥1) first bandwidths, and the first bandwidth may include one or more of bandwidths such as a CC, a BP, and a wideband bandwidth. The network device may notify, by using the third indication information of $\log_2 M$ bits, the terminal device of the parameters of the first bandwidth. This embodiment of this application is not limited herein.

It should be understood that, a frequency domain of the target resource and a frequency domain of the first bandwidth may be the same or partially overlap. The frequency domain of the target resource may further be a part of a frequency domain of the second bandwidth, or a part of the frequency domain of the first bandwidth. This embodiment of this application is not limited herein.

Optionally, in an embodiment, the first bandwidth may include any one of an operating bandwidth of the terminal device, a cell bandwidth serving the terminal device, and a carrier bandwidth. For example, the first bandwidth may be a CC, a plurality of CCs after carrier aggregation, a BP, a cell bandwidth, a maximum system bandwidth, or the like. The second bandwidth may include any one of a maximum system bandwidth, a cell bandwidth, and a wideband carrier bandwidth. The frequency domain of the first bandwidth may be a part of the frequency domain of the second bandwidth, or the frequency domain of the first bandwidth and a part of the frequency domain of the second bandwidth overlap, and a bandwidth value of the first bandwidth may be less than or equal to a bandwidth value of the second bandwidth. This embodiment of this application is not limited herein.

Optionally, in an embodiment, the parameters of the second bandwidth include at least one of the following parameters: a center frequency of the second bandwidth, a bandwidth value of the second bandwidth, and a frequency domain start position of the second bandwidth.

Optionally, in an embodiment, the parameters of the first bandwidth include at least one of the following parameters: a center frequency of the first bandwidth, a bandwidth value of the first bandwidth, and a frequency domain start position of the first bandwidth.

Specifically, a method for generating a reference signal on the first bandwidth may be the same as or different from a method for generating a reference signal on the second bandwidth, or a length of the reference signal sequence generated on the first bandwidth and the second bandwidth needs to be generated based on a maximum value of the two bandwidths or another larger bandwidth value. That is, a generated length of a reference signal on the first bandwidth is generated based on the second bandwidth, or both a reference signal on the first bandwidth and the reference signal sequence on the second bandwidth are generated based on the maximum bandwidth. Reference sequences of an overlapping part of the first bandwidth and the second bandwidth in frequency domain may be configured to be the same, orthogonal, or quasi-orthogonal. Because the frequency domain start position of the first bandwidth and the frequency domain start position of the second bandwidth may be different, it may be considered that the frequency domain start position of the first bandwidth has an offset value relative to the frequency domain start position of the second bandwidth, and corresponding to a mapping formula of a reference signal sequence, a mapping formula of the reference signal sequence on the first bandwidth has an offset value relative to a mapping formula of the reference signal sequence on the second bandwidth. The parameters of the first bandwidth include at least one of the following parameters: a center frequency of the first bandwidth, a bandwidth value of the first bandwidth, and a frequency domain start position of the first bandwidth. The offset value is related to the parameters of the first bandwidth and the parameters of the second bandwidth. The parameters of the second bandwidth include at least one of the center frequency of the second bandwidth, the bandwidth value of the second bandwidth, and the frequency domain start position of the second bandwidth.

The offset value of the frequency domain start position of the first bandwidth relative to that of the second bandwidth may be determined based on the parameters of the first bandwidth and the parameters of the second bandwidth, to obtain the mapping formula of the reference signal sequence on the first bandwidth, the reference signal sequence on the first bandwidth may be made the same as the reference signal sequence on the second bandwidth by using respective mapping formulas, and therefore the reference signal sequence on the first bandwidth and the reference signal sequence on the second bandwidth may be configured to be orthogonal or quasi-orthogonal.

Optionally, the network device may notify the terminal device of the offset value of the frequency domain of the first bandwidth relative to that of the second bandwidth by using the second indication information. For example, a frequency domain resource element may be used as a basic unit, and a method for notifying the offset value may be notifying that the offset value is N times the frequency domain resource element. The frequency domain resource element may be an RB, a PRB, an RBG, a PRG, or the like. The frequency domain resource element may have a plurality of candidate values that are designated by the network device, or selection of the frequency domain resource element is related to an identifier of a CC or a wideband CC. The terminal device determines an offset value based on indication information of the network device and a size of a frequency domain of an RB in a system in which the terminal device is currently located. This embodiment of this application is not limited herein.

It should be further understood that, the network device may further send, to the terminal device, indication information used to inform about whether a plurality of terminal devices need to perform MU-MIMO. For example, the network device may indicate, by using indication information of X (X≥1) bits, that at a moment or in a period of time, an offset in the mapping formula is set to 0. Alternatively, the network device may determine, by using the indication information, to inform the terminal device that the offset value in the mapping formula needs to be calculated. This embodiment of this application is not limited herein.

It should be further understood that, sequence numbers of the foregoing processes do not mean execution orders in this embodiment of this application. The execution orders of the processes should be determined based on functions and internal logic of the processes, and should not be construed as any limitation on the implementation processes of the embodiments of this application.

Based on the method for determining a reference signal sequence provided in this embodiment of this application, the network device sends, to the terminal device, the second indication information used to indicate the parameters of the second bandwidth and the third indication information used to indicate the parameters of the first bandwidth, and MU-MIMO between the terminal device operating on the first bandwidth and the terminal device operating on the second bandwidth may be supported, that is, a reference signal sequence is determined based on parameters of the first bandwidth and the parameters of the second bandwidth. Finally, a reference signal sequence on the first bandwidth and a reference signal sequence on the second bandwidth are configured to be the same, orthogonal, or quasi-orthogonal, to support MU-MIMO between the terminal devices operating on the first bandwidth and the second bandwidth. The network device may correctly parse data in different terminal devices.

The method for determining a reference signal sequence of the embodiments of this application is described in detail above with reference to FIG. 1 to FIG. 7, and a terminal device and a network device of this embodiment of this application is described in detail below with reference to FIG. 8 to FIG. 11.

Figure 8:
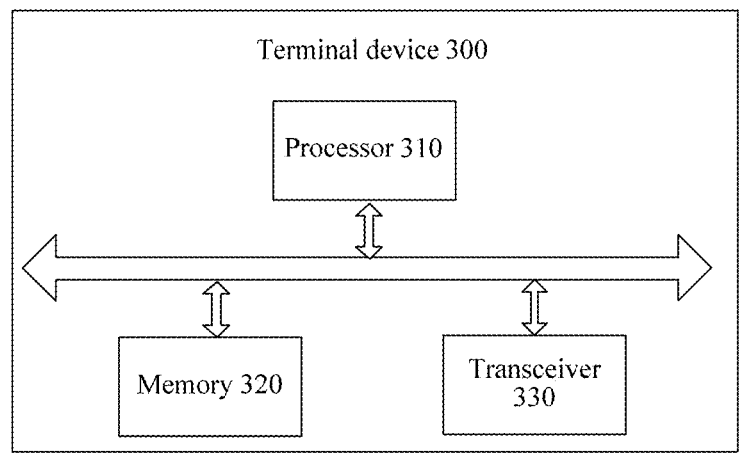
FIG. 8 is a schematic block diagram of a terminal device according to an embodiment of this application.

FIG. 8 is a schematic block diagram of a terminal device according to an embodiment of this application. It should be understood that, the terminal device embodiment and the method embodiment correspond to each other. For a similar description, refer to the method embodiment. The terminal device 300 shown in FIG. 8 may be configured to perform steps performed by the terminal device corresponding to FIG. 3. The terminal device 300 includes: a processor 310, a memory 320, and a transceiver 330. The processor 310, the memory 320, and the transceiver 330 are connected by using communication, the memory 320 stores an instruction, the processor 310 is configured to execute the instruction stored in the memory 320, and the transceiver 330 is configured to perform specific signal receiving/transmission under driving of the processor 310.

The transceiver 330 is configured to receive first indication information sent by a network device.

The processor 310 is configured to determine a target resource based on the first indication information.

The processor 310 is further configured to determine a reference signal sequence based on parameters of a first bandwidth and parameters of a second bandwidth.

The transceiver 330 is further configured to send or receive the reference signal sequence on the target resource.

The terminal device provided in this embodiment of this application can determine the reference signal sequence based on the parameters of the first bandwidth and the parameters of the second bandwidth, so that a reference signal sequence on the first bandwidth and a reference signal sequence on the second bandwidth are the same. When different terminal devices respectively access the first bandwidth and the second bandwidth to perform MU-MIMO, the reference signal sequence on the first bandwidth and the reference signal sequence on the second bandwidth may be configured to be the same, orthogonal, or quasi-orthogonal, to support MU-MIMO between the terminal devices operating on the first bandwidth and the second bandwidth, improving user experience.

Components in the terminal device 300 are connected by using communication, that is, the processor 310, the memory 320, and the transceiver 330 communicate with each other and transfer a control and/or data signal between each other by using an internal connection path. The foregoing method embodiment of this application may be applied to the processor, or the processor implements steps of the foregoing method embodiment. The processor may be an integrated circuit chip and has a signal processing capability. In an implementation process, the steps in the foregoing method embodiments may be completed by using an integrated logic circuit of hardware in the processor or an instruction in a form of software. The processor may be a central processing unit (CPU), a network processor (NP), a combination of a CPU and an NP, a digital signal processor (DSP), an application-specific integrated circuit (ASIC), a field programmable gate array (FPGA), another programmable logic device, a discrete gate, a transistor logic device, or a discrete hardware component. The processor may implement or perform methods, steps, and logical block diagrams disclosed in this application. The general purpose processor may be a microprocessor, or the processor may be any conventional processor or the like. Steps of the methods disclosed in this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable read-only memory, or a register. The storage medium is located in the memory, and the processor reads information in the memory, and completes the steps of the foregoing methods in combination with hardware of the processor.

Optionally, in another embodiment of this application, the parameters of the second bandwidth include at least one of the following parameters: a center frequency of the second bandwidth, a bandwidth value of the second bandwidth, and a frequency domain start position of the second bandwidth.

Optionally, in another embodiment of this application, the parameters of the first bandwidth include at least one of the following parameters: a center frequency of the first bandwidth, a bandwidth value of the first bandwidth, and a frequency domain start position of the first bandwidth.

Optionally, in another embodiment of this application, the transceiver 330 is further configured to receive second indication information sent by the network device, and the processor 310 is further configured to determine at least one of the parameters of the second bandwidth based on the second indication information.

Optionally, in another embodiment of this application, the transceiver 330 is further configured to receive third indication information sent by the network device, and the processor 310 is further configured to determine at least one of the parameters of the first bandwidth based on the third indication information.

Optionally, in another embodiment of this application, the processor 310 is specifically configured to determine the reference signal sequence based on a subcarrier spacing and the parameters of the first bandwidth, the parameters of the second bandwidth.

Optionally, in another embodiment of this application, a frequency domain of the target resource determined by the processor 330 and a frequency domain of the first bandwidth are the same or partially overlap.

Optionally, in another embodiment of this application, the bandwidth value of the first bandwidth is less than the bandwidth value of the second bandwidth.

Optionally, in another embodiment of this application, the first bandwidth is any one of an operating bandwidth of the terminal device, a serving cell bandwidth, and a carrier bandwidth, and the second bandwidth is any one of a maximum system bandwidth, a cell bandwidth, and a wideband carrier bandwidth.

Figure 9:
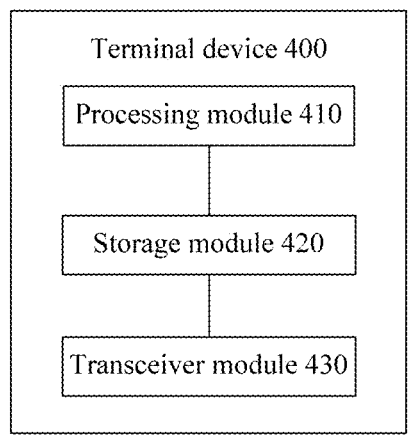
FIG. 9 is a schematic block diagram of a terminal device according to another embodiment of this application.

It should be noted that, in this embodiment of this application, the processor 310 may be implemented by a processing module, the memory 320 may be implemented by a storage module, and the transceiver 330 may be implemented by a transceiver module. As shown in FIG. 9, a terminal device 400 may include a processing module 410, a storage module 420, and a transceiver module 430.

The terminal device 300 shown in FIG. 8 or the terminal device 400 shown in FIG. 9 can implement steps performed by the terminal device in FIG. 3. To avoid repetition, details are not described herein again.

Figure 10:
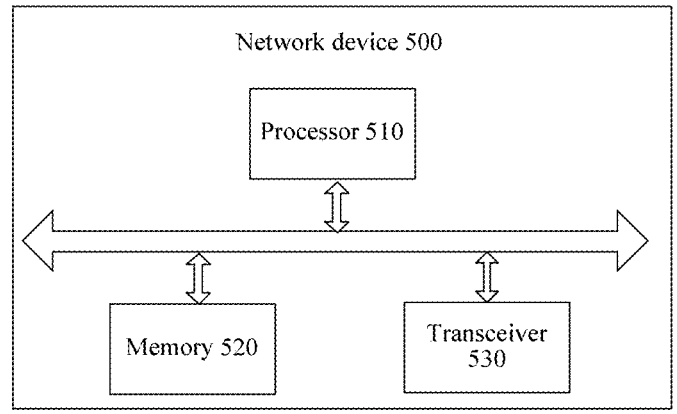
FIG. 10 is a schematic block diagram of a network device according to an embodiment of this application.

FIG. 10 is a schematic block diagram of a network device 500 according to an embodiment of this application. It should be understood that, the network device embodiment and the method embodiment correspond to each other. For a similar description, refer to the method embodiment. As shown in FIG. 10, the network device 500 includes: a processor 510, a memory 520, and a transceiver 530. The processor 510, the memory 520, and the transceiver 530 are connected by using communication, the memory 520 stores an instruction, the processor 510 is configured to execute the instruction stored in the memory 520, and the transceiver 530 is configured to perform specific signal receiving/transmission under driving of the processor 510.

The transceiver 530 is configured to send first indication information to a terminal device, where the first indication information is used to indicate a target resource.

The transceiver 530 is further configured to send second indication information to the terminal device, where the second indication information is used to indicate at least one of parameters of a second bandwidth.

Based on the network device provided in this embodiment of this application, the network device sends, to the terminal device, the indication information used to indicate the parameters of the second bandwidth, and MU-MIMO between UE operating on a first bandwidth and UE operating on the second bandwidth may be supported, that is, a reference signal sequence is determined based on parameters of the first bandwidth and the parameters of the second bandwidth. Finally, a reference signal sequence on the first bandwidth and a reference signal sequence on the second bandwidth are configured to be the same, orthogonal, or quasi-orthogonal, to support MU-MIMO between the terminal devices operating on the first bandwidth and the second bandwidth. The network device may correctly parse data in different terminal devices.

Components in the network device 500 are connected by using communication, that is, the processor 510, the memory 520, and the transceiver 530 communicate with each other and transfer a control and/or data signal between each other by using an internal connection path. It should be noted that, the foregoing method embodiment of this application may be applied to the processor, or the processor implements steps of the foregoing method embodiment. The processor may be an integrated circuit chip and has a signal processing capability. In an implementation process, the steps in the foregoing method embodiments may be completed by using an integrated logic circuit of hardware in the processor or an instruction in a form of software. The processor may be a central processing unit CPU, an NP, a combination of a CPU and an NP, a DSP, an ASIC, an FPGA, another programmable logic device, a discrete gate, a transistor logic device, or a discrete hardware component. The processor may implement or perform methods, steps, and logical block diagrams disclosed in this application. The general purpose processor may be a microprocessor, or the processor may be any conventional processor or the like. Steps of the methods disclosed in this application may be directly performed and completed by a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable read-only memory, or a register. The storage medium is located in the memory, and the processor reads information in the memory, and completes the steps of the foregoing methods in combination with hardware of the processor.

Optionally, in another embodiment of this application, the transceiver 530 is further configured to send third indication information to the terminal device, where the third indication information is used to indicate at least one of the parameters of the first bandwidth.

Optionally, in another embodiment of this application, the parameters of the second bandwidth and the parameters of the first bandwidth are used by the terminal device to determine a reference signal sequence, and the reference signal sequence is sent on the target resource.

Optionally, in another embodiment of this application, the parameters of the second bandwidth include at least one of the following parameters: a center frequency of the second bandwidth, a bandwidth value of the second bandwidth, and a frequency domain start position of the second bandwidth.

Optionally, in another embodiment of this application, the parameters of the first bandwidth include at least one of the following parameters: a center frequency of the first bandwidth, a bandwidth value of the first bandwidth, and a frequency domain start position of the first bandwidth.

Optionally, in another embodiment of this application, a frequency domain of the target resource and a frequency domain of the first bandwidth are the same or partially overlap. The bandwidth value of the first bandwidth is less than the bandwidth value of the second bandwidth.

Optionally, in another embodiment of this application, the first bandwidth is any one of an operating bandwidth of the terminal device, a serving cell bandwidth, and a carrier bandwidth, and the second bandwidth is any one of a maximum system bandwidth, a cell bandwidth, and a wideband carrier bandwidth.

Figure 11:
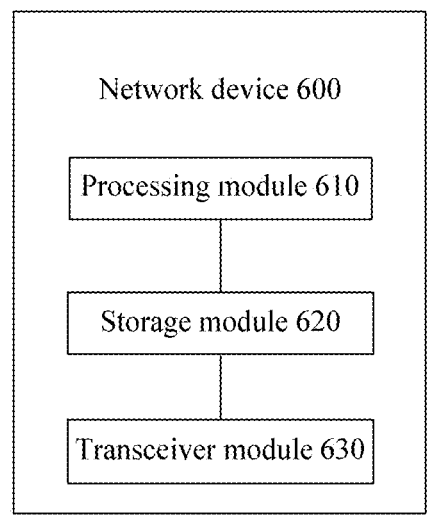
FIG. 11 is a schematic block diagram of a network device according to another embodiment of this application.

It should be noted that, in this embodiment of the present invention, the processor 510 may be implemented by a processing module, the memory 520 may be implemented by a storage module, and the transceiver 530 may be implemented by a transceiver module. As shown in FIG. 11, a network device 600 may include a processing module 610, a storage module 620, and a transceiver module 630.

The network device 500 shown in FIG. 10 or the network device 600 shown in FIG. 11 can implement steps performed by the network device in FIG. 7. To avoid repetition, details are not described herein again.

An embodiment of this application further provides a computer readable medium. The computer readable medium is configured to store a computer program, and the computer program includes an instruction configured to perform the method for determining a reference signal sequence of the implementations of this application in FIG. 3 and FIG. 7. The readable medium may be a read-only memory (ROM) or a random access memory (RAM). This is not limited in this embodiment of this application.

An embodiment of this application further provides a communications system. The communications system includes the terminal device provided in this embodiment of this application and the network device provided in this embodiment of this application, and the communications system may complete any method for determining a reference signal sequence provided in this embodiment of this application.

The term "and/or" and "at least one of A or B" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in this embodiment of this application. The foregoing storage medium includes: any medium that can store program code, such as a USB flash drive, a removable hard disk, a ROM, a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, comprising:
   receiving first indication information from a network device, the first indication information indicating a target resource;
   receiving second indication information from the network device, the second indication information indicating a frequency domain start position of a maximum system bandwidth;
   receiving third indication information from the network device, the third indication information indicating a frequency domain start position of a bandwidth part;
   determining a reference signal sequence based on an offset between the frequency domain start position of the bandwidth part and the frequency domain start position of the maximum system bandwidth; and
   sending the reference signal sequence via the target resource.

2. The method according to claim 1, wherein a frequency domain of the target resource and a frequency domain of the bandwidth part satisfy one of:
   the frequency domain of the target resource and the frequency domain of the bandwidth part being the same; or
   the frequency domain of the target resource being a part of the frequency domain of the bandwidth part.

3. The method according to claim 1, wherein the determining of the reference signal sequence comprises:
   determining the reference signal sequence based on a subcarrier spacing and further based on the offset between the frequency domain start position of the bandwidth part and the frequency domain start position of the maximum system bandwidth.

4. The method according to claim 1, wherein a reference signal of the reference signal sequence and another reference signal carried on the frequency domain of the target resource are one of the same, orthogonal or quasi-orthogonal.

5. A method, comprising:
   sending first indication information to a terminal, wherein the first indication information indicates a target resource;
   sending second indication information to the terminal, wherein the second indication information indicates a frequency domain start position of a maximum system bandwidth;
   sending third indication information to the terminal, wherein the third indication information indicates a frequency domain start position of a bandwidth part;
   determining a reference signal sequence based on an offset between the frequency domain start position of the bandwidth part and the frequency domain start position of the maximum system bandwidth; and
   sending the reference signal sequence using the target resource.

6. The method according to claim 5, wherein a frequency domain of the target resource and a frequency domain of the bandwidth part satisfy one of:
   the frequency domain of the target resource and the frequency domain of the bandwidth part being the same; or
   the frequency domain of the target resource being a part of the frequency domain of the bandwidth part.

7. The method according to claim 5, wherein the determining of the reference signal sequence comprises:
   determining the reference signal sequence based on a subcarrier spacing and further based on the offset between the frequency domain start position of the bandwidth part and the frequency domain start position of the maximum system bandwidth.

8. The method according to claim 5, wherein a reference signal of the reference signal sequence and another reference signal carried on a frequency domain of the target resource are one of the same, orthogonal or quasi-orthogonal.

9. An apparatus, comprising:
   one or more processors; and
   a non-transitory memory in communications with the one or more processors and storing computer instructions for execution by the one or more processors, the computer instructions including instructions to:
      receive first indication information from a network device, the first indication information indicating a target resource;
      receive second indication information from the network device, the second indication information indicating a frequency domain start position of a maximum system bandwidth;
      receive third indication information from the network device, the third indication information indicating a frequency domain start position of a bandwidth part;
      determine a reference signal sequence based on an offset between the frequency domain start position of the bandwidth part and the frequency domain start position of the maximum system bandwidth; and
      send the reference signal sequence via the target resource.

10. The apparatus according to claim 9, wherein a frequency domain of the target resource and a frequency domain of the bandwidth part satisfy one of:
    the frequency domain of the target resource and the frequency domain of the bandwidth part being the same; or
    the frequency domain of the target resource being a part of the frequency domain of the bandwidth part.

11. The apparatus according to claim 9, wherein the instructions to determine the reference signal sequence include instructions to:
    determine the reference signal sequence based on a subcarrier spacing and further based on the offset between the frequency domain start position of the bandwidth part and the frequency domain start position of the maximum system bandwidth.

12. The apparatus according to claim 9, wherein a reference signal of the reference signal sequence and another reference signal carried on the frequency domain of the target resource are one of the same, orthogonal or quasi-orthogonal.

13. An apparatus, comprising:
    one or more processors; and
    a non-transitory memory in communications with the one or more processors and storing computer instructions for execution by the one or more processors, the computer instructions including instructions to:

send first indication information to a terminal, wherein the first indication information indicates a target resource;

send second indication information to the terminal, wherein the second indication information indicates a frequency domain start position of a maximum system bandwidth;

send third indication information to the terminal, wherein the third indication information indicates a frequency domain start position of a bandwidth part;

determine a reference signal sequence based on an offset between the frequency domain start position of the bandwidth part and the frequency domain start position of the maximum system bandwidth; and send the reference signal sequence using the target resource.

14. The apparatus according to claim 13, wherein a frequency domain of the target resource and a frequency domain of the bandwidth part satisfy one of:

the frequency domain of the target resource and the frequency domain of the bandwidth part being the same; or the frequency domain of the target resource being a part of the frequency domain of the bandwidth part.

15. The apparatus according to claim 13, wherein the instructions to determine the reference signal sequence include instructions to:

determine the reference signal sequence based on a subcarrier spacing and further based on the offset between the frequency domain start position of the bandwidth part and the frequency domain start position of the maximum system bandwidth.

16. The apparatus according to claim 13, wherein a reference signal of the reference signal sequence and another reference signal carried on a frequency domain of the target resource are one of the same, orthogonal or quasi-orthogonal.

17. A non-transitory computer-readable storage medium, comprising:

executable instructions, the executable instructions, when executed by a computer system, causing the computer system to:

receive first indication information from a network device, the first indication information indicating a target resource;

receive second indication information from the network device, the second indication information indicating a frequency domain start position of a maximum system bandwidth;

receive third indication information from the network device, the third indication information indicating a frequency domain start position of a bandwidth part;

determine a reference signal sequence based on an offset between the frequency domain start position of the bandwidth part and the frequency domain start position of the maximum system bandwidth; and send the reference signal sequence via the target resource.

18. The non-transitory computer-readable storage medium according to claim 17, wherein a frequency domain of the target resource and a frequency domain of the bandwidth part satisfy one of:

the frequency domain of the target resource and the frequency domain of the bandwidth part being the same; or the frequency domain of the target resource being a part of the frequency domain of the bandwidth part.

19. The non-transitory computer-readable storage medium according to claim 17, wherein the executable instructions, when executed by a computer system to determine the reference signal sequence, causing the computer system to:

determine the reference signal sequence based on a subcarrier spacing and further based on the offset between the frequency domain start position of the bandwidth part and the frequency domain start position of the maximum system bandwidth.

20. The non-transitory computer-readable storage medium according to claim 17, wherein a reference signal of the reference signal sequence and another reference signal carried on the frequency domain of the target resource are one of the same, orthogonal or quasi-orthogonal.

21. A non-transitory computer-readable storage medium, comprising:

executable instructions, the executable instructions, when executed by a computer system, causing the computer system to:

send first indication information to a terminal, wherein the first indication information indicates a target resource;

send second indication information to the terminal, wherein the second indication information indicates a frequency domain start position of a maximum system bandwidth;

send third indication information to the terminal, wherein the third indication information indicates a frequency domain start position of a bandwidth part;

determine a reference signal sequence based on an offset between the frequency domain start position of the bandwidth part and the frequency domain start position of the maximum system bandwidth; and send the reference signal sequence using the target resource.

22. The non-transitory computer-readable storage medium according to claim 21, wherein a frequency domain of the target resource and a frequency domain of the bandwidth part satisfy one of:

the frequency domain of the target resource and the frequency domain of the bandwidth part being the same; or the frequency domain of the target resource being a part of the frequency domain of the bandwidth part.

23. The non-transitory computer-readable storage medium according to claim 21, wherein the executable instructions, when executed by a computer system to determine the reference signal sequence, causing the computer system to:

determine the reference signal sequence based on a subcarrier spacing and further based on the offset between the frequency domain start position of the bandwidth part and the frequency domain start position of the maximum system bandwidth.

24. The non-transitory computer-readable storage medium according to claim 21, wherein a reference signal of the reference signal sequence and another reference signal carried on a frequency domain of the target resource are one of the same, orthogonal or quasi-orthogonal.

* * * * *

UNITED STATES PATENT AND TRADEMARK OFFICE
CERTIFICATE OF CORRECTION

PATENT NO. : 11,843,492 B2
APPLICATION NO. : 17/675363
DATED : December 12, 2023
INVENTOR(S) : Wu et al.

It is certified that error appears in the above-identified patent and that said Letters Patent is hereby corrected as shown below:

In the Specification

In Column 8, Line 20, delete "$c_{init},$" and insert -- $c_{init}$ --.

In Column 11, Line 61, delete "CC" and insert -- CC1 --.

In Column 14, Line 36, delete "$3n_{PRB}$" and insert -- $3 \cdot n_{PRB}$ --.

Signed and Sealed this
Twentieth Day of February, 2024

*Katherine Kelly Vidal*
Katherine Kelly Vidal
*Director of the United States Patent and Trademark Office*